United States Patent
Kim et al.

(10) Patent No.: US 8,891,564 B2
(45) Date of Patent: *Nov. 18, 2014

(54) FEMTOSECOND LASER APPARATUS AND FEMTOSECOND LASER SYSTEM INCLUDING THE SAME

(71) Applicant: Korea Electrotechnology Research Institute, Changwon (KR)

(72) Inventors: Guang Hoon Kim, Busan (KR); Uk Kang, Seoul (KR); Ju Hee Yang, Seoul (KR); Dae Sik Lee, Daejeon (KR); Elena Sall, Seoul (KR); Sergey Chizhov, Seoul (KR); Andrey Kulik, Seoul (KR); Vladimir Yashin, Seoul (KR)

(73) Assignee: Korea Electrotechnology Research Institute, Changwon (KR)

( * ) Notice: Subject to any disclaimer, the term of this patent is extended or adjusted under 35 U.S.C. 154(b) by 30 days.

This patent is subject to a terminal disclaimer.

(21) Appl. No.: 13/753,512
(22) Filed: Jan. 29, 2013
(65) Prior Publication Data

US 2013/0336345 A1 Dec. 19, 2013

Related U.S. Application Data

(63) Continuation-in-part of application No. 13/563,434, filed on Jul. 31, 2012, now Pat. No. 8,582,613.

(30) Foreign Application Priority Data

Jun. 18, 2012 (KR) .................. 10-2012-0065248

(51) Int. Cl.
| | |
|---|---|
| H01S 3/10 | (2006.01) |
| H01S 3/00 | (2006.01) |
| H01S 3/07 | (2006.01) |
| H01S 3/23 | (2006.01) |
| H01S 3/14 | (2006.01) |
| H01S 3/08 | (2006.01) |
| H01S 3/16 | (2006.01) |
| H01S 3/0941 | (2006.01) |
| H01S 3/094 | (2006.01) |

(52) U.S. Cl.
CPC ............... H01S 3/14 (2013.01); H01S 3/0057 (2013.01); *H01S 3/0805* (2013.01); H01S 3/10 (2013.01); *H01S 3/1618* (2013.01); H01S 3/07 (2013.01); H01S 3/235 (2013.01); *H01S 3/1675* (2013.01); *H01S 3/0941* (2013.01); *H01S 3/094053* (2013.01); H01S 3/094 (2013.01)

USPC ............... 372/25; 372/41; 372/18; 372/75; 372/106

(58) Field of Classification Search
USPC .................................. 372/25, 41, 18, 75, 106
See application file for complete search history.

(56) References Cited

U.S. PATENT DOCUMENTS

| | | | |
|---|---|---|---|
| 8,582,613 B1 * | 11/2013 | Kim et al. ............... | 372/25 |
| 2003/0091078 A1* | 5/2003 | Braun et al. ............ | 372/41 |
| 2012/0050843 A1 | 3/2012 | Limpert et al. | |

FOREIGN PATENT DOCUMENTS

| | | |
|---|---|---|
| JP | 2000-252560 A | 9/2000 |
| JP | 2003-163394 A | 6/2003 |

(Continued)

OTHER PUBLICATIONS

Youngjoo Chang, Pre-Search Report, Aug. 6, 2012, 5 pages, Wips Co., Ltd. Seoul, Republic of Korea.

*Primary Examiner* — Kinam Park
(74) *Attorney, Agent, or Firm* — Patent Office of Dr. Chung Park

(57) ABSTRACT

There is disclosed a femtosecond laser apparatus including a first laser material comprising Ng, Np and Nm axes spatially perpendicular to each other; a second laser material comprising Np axis, Nm axis and Ng axis; and a first laser diode and second laser diodes, wherein the traveling direction of laser beams generated from the first and second laser materials is substantially parallel to Ng axis of the first laser material and the polarizing direction of laser beams generated from the first and second laser materials is substantially parallel to Np axis of the first laser material, and the traveling direction of laser beams generated from the first and second laser materials is substantially parallel to Np axis of the second material and the polarizing direction of laser beams generated from the first and second laser materials is substantially parallel to Nm axis of the second laser material.

26 Claims, 15 Drawing Sheets

(56) References Cited

FOREIGN PATENT DOCUMENTS

| JP | 2008-277705 | A | 11/2008 |
| KR | 10-2006-012735 | A | 11/2006 |
| KR | 10-2010-0110109 | A | 10/2010 |

* cited by examiner

FEMTOSECOND LASER APPARATUS AND FEMTOSECOND LASER SYSTEM INCLUDING THE SAME

FIELD

The present invention relates to a femtosecond laser apparatus, more particularly, to a femtosecond laser apparatus that is able to enhance an output power of laser and a quality of pulse beam, and a femtosecond laser system including the same.

BACKGROUND

A femtosecond laser light source generates an ultrashort pulse having a high peak power and has a high average output of generated pulses. Examples of such a femtosecond laser light source include a femtosecond (fs) laser pulse. The femtosecond laser light sources have been broadly applied not only to basic science fields including ultrahigh speed aspectrochemistry, high energy physics, XUV-wave generation and the like but also to a variety of fields including microprecision laser processing, micro-surgery.

Generally, the femtosecond laser pulse has good properties. Examples of the good properties include a short pulse time width, a high peaking power and a broad spectrum bandwidth.

Such the femtosecond laser pulse may be applied to micro or nano processing of electronic components and optical components requiring ultraprecision. Examples of such electronic and optical components include a solar cell, an optical memory, a semiconductor and a flat panel display. Accordingly, demands on femtosecond pulse laser system for industry have been increasing.

To meet such demands on the femtosecond pulse laser system, conditions for applying the femtosecond laser pulse to the ultra precision laser processing will be described.

First of all, a laser pulse time width is much shorter than an electronphonon relaxation time of an object not to transmit a thermal energy generated in processing to a portion near a portion that will be processed (non-thermal processing).

That is called as cold ablation.

For example, the electronphonon relaxation time of aluminum is 4.27 picosecond (hereinafter, ps) and that of iron is 3.5 ps and that of copper is 57.5 ps.

Specifically, when femtosecond laser processing aluminum, laser pulse are applied to aluminum in a pulse time width that is a picoseconds or less for cold ablation.

Accordingly, the femtosecond laser is proper to the ultraprecision laser processing of cold ablation.

A femtosecond laser pulse in a femtosecond range can minimize thermal diffusion in a processing region and not cause the damage generated by latent heat. Accordingly, the femtosecond laser can process quite a hard material and have a short pulse time width as well as high pulse energy, with a high peak power, only to be advantageous to a nonlinear optical effect, namely, multi-photon absorption. Accordingly, the femtosecond laser can perform various nanometer scaled ultra precision processing of various materials. Examples of such various materials include glass, polymer and even transparent materials.

Second, processing object materials have an ablation threshold values that are approximately several $J/cm^2$ or more. Considering the size of the laser beam concentrated on a processing area for ablation processing, a pulse energy of approximately 10 μJ is required.

In some cases of material processing application can require hundreds of μJ pulse energy.

An exemplary one of lasers having those good properties may be titanium sapphire laser (Ti: sapphire laser).

Until now, a commercially useful Ti sapphire laser may provide approximately several to hundreds of femtosecond pulse time width, several mJ or several J pulse energy.

However, in a conventional femtosecond laser apparatus, a high-priced high output pulse green laser such as $Nd:TVO_4$ laser has to be used as a pumping laser source and it is difficult to gain dozens of kHz or more pulse repetition rate.

Also, the Ti sapphire laser has a large scale system and a high price and also it is difficult to maintain a pulse power stably and it is not easy to use the Ti sapphire laser in a production worksite.

Meanwhile, a diode-pumped solid-state (DPSS) laser uses a micro-sized light source as a pump beam source. Examples of such a micro-sized light source include a laser diode. As a femtosecond laser is configurated by using a solid laser material, an optical pumping structure can be simple and the size of a laser head can be small. Also, a laser diode at a wavelength commercially used in various fields has a relatively low price in comparison to the power thereof and the price of the femtosecond laser can be reduced, such that an effect of cost reduction can be gained.

In addition, the solid laser has a short optical pumping distance and it can perform stable laser operation, such that it can be advantageously applied to a laser for industrial usage.

Recently, with development of semiconductor and electronic technologies, a laser diode array, a laser diode bar and the like have been developed that are able to perform high power, with small sizes and high efficiency, and development of solid laser systems using diode pumping have been growing rapidly.

To realize the femtosecond laser system that is able to optically pump, using a laser diode, it is necessary to select a laser material meeting predetermined conditions and to design and fabricate an optical pumping module for performing the optical pumping.

Crystals doped with rare-earth ions that can perform diode pumping at 808 nm and 980 nm, respectively, may be usually used as the laser material for diode pumping. Examples of such crystals doped with rare-earth ion may include Neodymium (Nd) and Ytterbium (Yb).

In an early stage of a high power laser developing step, a laser crystal doped with Neodymium is preferred because of a 4-level structure and various absorption lines. In recent, a laser crystal doped with Ytterbium has been used a lot because of excellent thermal and optical properties.

There are additional necessary conditions required to apply the femtosecond laser light source to industrial settings including the ultraprecision laser processing.

For example, if a pulse repetition rate of a laser is low, it takes much time to perform laser processing and productivity of the industrial settings might deteriorate.

However, it is preferred to heighten the pulse repetition rate of the laser but it is restricted to height the pulse repetition rate.

If the pulse repetition rate is too high to receive the next laser pulse before plasma generated by the femtosecond laser pulse disappears, the next laser pulse can be ill-affected by the plasma remaining near a target. For example, a beam traveling direction of the next laser pulse might be changed or the pulse time width thereof might be changed.

That phenomenon is called as 'plasma shielding'.

To restrain the plasma shielding, the next laser pulse has to be applied after a relaxation time of the former plasma.

In other words, a time interval between one laser pulse and the next laser pulse has to be longer than the plasma relaxation time. The plasma relaxation time may be different for each of processing object materials. However, the repetition rate of the plasma relaxation time is approximately 1 MHz based on the laser pulse repetition rate.

Accordingly, to maintain the high productivity in industrial settings, a femtosecond laser having a pulse repetition rate at hundreds of kHz is required.

In addition, to mount a laser light source to a laser processing system and to operate the laser processing system, the femtosecond laser is required to have a compact size and a low price and a high operation stability that makes a laser operational state not changed for a substantially long time.

When a femtosecond pulse is generated in mode locking in a femtosecond oscillator initially, a pulse energy of the femtosecond pulse is lowered by a nanojoule (nJ) and it is not appropriate to apply such the femtosecond pulse to a laser processing.

To enhance the femtosecond pulse energy, Chirped Pulse Amplification (CPA) is used.

For example, a pulse stretcher is used in stretching a pulse generated from a femtosecond oscillator longitudinally and timely and the pulse is applied to an amplifier to amplify the pulse energy.

Hence, the amplified pulse passes a pulse compressor to restitute a time width of the pulse to an initial femtosecond range.

At this time, the pulses generated from the oscillator are employed as seeding pulses applied to the amplifier.

Pulses are timely and longitudinally stretched by a difference of passages according to wavelengths generated in the pulse stretcher, which can be called as 'chirping' and technology for amplifying the pulse energy is called as 'chirp pulse amplification technology'.

When using such chirp pulse amplification technology, a peaking power of the pulse amplified in a resonance cavity of the pulse amplifier kept low and non-linear distortion generated in spatial or temporal distribution of the laser pulses can be retrained. Moreover, a physical damage applied to optical components composing the system can be prevented.

Specifically, the pulse amplifier can be operated to prevent the damage to the system generated by the high energy laser pulse and to enhance the pulse energy.

Recently, the high pulse energy has been gained from MOPA system combined with Maser Oscillator (MO) and Power Amplifier (PA) and a huge step has made in development of femtosecond laser systems having a high peaking power and a high average power accordingly. The master oscillator directly pumps a diode light source based on the chirp pulse amplification technology and the power amplifier directly pumps the diode light source.

However, the laser material doped with Ytterbium has a 2-level energy structure or a 3-level energy structure and it has a disadvantage that lights emitted at an optical pumping wavelength of 981 nm is absorbed by the laser material again.

To solve the disadvantage, the light generated from a high brightness laser diode having a high power is focused on the laser crystal with a micro-spot size.

In this process, pump beams failed to be converted into laser beams are transmitted adjacent to the spot of the laser crystal in a thermal energy type and to a mount where the laser crystal is mounted.

When the thermal energy is collected largely, amplified laser beams are crushed and the quality of beams might deteriorate. Also, an average power of lasers and pulse energy might be restricted.

After that, the thermal energy focused on the laser crystal is higher than a damage threshold, the laser crystal might have physical damage, for example, crack or break only to stop laser oscillation problematically.

Meanwhile, conventional studies on generation or amplification of femtosecond pulses by using a plurality of Yb:KYW or Yb:KGW laser crystals will be described as follows.

For example, U.S. Pat. No. 7,508,847 B2 discloses a new concept of increasing the frequency of passages of laser beams via gain material in a resonance cavity by pumping two anisotropic materials including Yb:KGW.

However, in the application, the length of the resonance cavity is increased to reduce an instable phenomenon of a pulse power called as "Triggered mode". It is proposed that a pumping structure of two gain materials using one of various types of long resonance cavities. However, that application fails to experimental embodiments and results.

In addition, U.S. Pat. No. 6,760,356 B2 discloses a method of amplifying a femtosecond pulse by using two anisotropic laser crystals of Yb:YAG.

However, those two prior patent applications disclose only the power amplification by using only two laser materials and fail to disclose thermal, optical and other various characteristics that have to be put into consideration of an optical axis of a laser material in the other femtosecond laser systems. In other words, the two patent applications disclose only an effect of the output power enhanced by increasing the numbers of the laser materials, with no comments on the axis of the laser material.

Meanwhile, U.S. Pat. No. 6,891,876 B2 discloses a study on absorbing depolarized pump beams by selecting an axis of an Yb:KYW laser material and controlling a polarization rate of lights pumping a laser material.

The application focuses on light pumping of an anisotropic material. Even in case of using a first depolarized pump beam, an axis of an anisotropic gain material and a wavelength of a pumping laser are selected to optically pump the laser material efficiently.

The application discloses that even in case the wavelength of a second pump beam is instable, an axis of the laser material is selected to optically pump the laser material efficiently.

The proposed method uses an absorption spectrum that is differentiated according to an axis direction of the laser material and properly determines a direction of the laser material based on the different absorption spectrums to properly mix two axes of one laser material. When the intensity of the pump beam is controlled according to the polarization direction, similar absorption cross-sections are shown in broad wavelength region.

However, in this instance, there is an advantage of providing a light pumping unit less sensitive to instability of polarization or wavelength of the pump beam. However, to have similar absorption cross-sections in broad wavelength regions, an absorption cross-section of the laser material has to perform light pumping in a wavelength region having a small absorption cross-section of the laser material.

Moreover, the output has to be dispersed to two polarized lights from one laser light source. Because of that, pumping efficiency could deteriorate badly and the pump beams absorbed after failed to be converted into laser wavelengths are focused on the laser material by the terminal energy, such that the quality of the laser beam may deteriorate and the power of the laser beam may be restricted disadvantageously.

The Yb:KYW or Yb:KGW laser crystal has a good heat conduction quality and it has an advantage of generating a high average power femtosecond laser. However, the conductivity of the anisotropy laser material such as Yb:KYW or Yb:KGW is differentiated according to the axis direction. If the average power of the laser is high, astigmatism of a thermal lens might be generated by a thermal effect and the shape of the laser beam is distorted to deteriorate the quality of the laser beam.

In addition, while generating or amplifying the femtosecond pulse by using the plurality of the laser crystals, the pump beam generated from the laser diode is incident on and absorbed to one of the laser crystals and the other pump beams not absorbed to the laser crystal are irradiated to optical components or optical mounts. Accordingly, the alignment of the pump beams and laser beams might deteriorate.

DETAILED DESCRIPTION OF THE INVENTION

Technical Problem

To solve those disadvantages, an object of the invention is to provide a femtosecond laser apparatus that can enhance a quality and a power intensity of beams, without beam distortion by using a plurality of laser materials and making laser beams generated from the laser materials be substantially parallel to a specific axis of the laser materials, and a femtosecond laser system including the same.

Another object of the present invention is to provide a femtosecond laser apparatus that is able to restrain gain narrowing generated while amplifying a pulse spectrum-shaped in an extra-cavity as a seeding pulse so as to shorten the time width of a pulse emitted from a laser system including the same, and a femtosecond laser system including the same.

A further object of the present invention is to provide a femtosecond laser apparatus that is able to broaden a bandwidth of a gain spectrum by making a polarizing direction of laser beams generated from laser materials be substantially parallel to a specific axis of each laser material, and a femtosecond laser system including the same.

A still further object of the present invention is to provide a femtosecond laser apparatus that is able to broaden spectrums of a pulses by overlapping gain spectrums of laser materials having different wavelengths corresponding to the maximum value of an emission cross section, and a femtosecond laser system including the same.

A still further object of the present invention is to provide a femtosecond laser apparatus that is able to prevent an alignment characteristic of pump beams and laser beams generated in a process of generating or amplifying femtosecond pulses from a plurality of laser materials when generating femtosecond pulses by using a plurality of laser materials.

Technical Solution

To achieve these objects and other advantages and in accordance with the purpose of the embodiments, as embodied and broadly described herein, a femtosecond laser apparatus includes a first laser material comprising Ng, Np and Nm axes spatially perpendicular to each other; a second laser material comprising Np axis substantially parallel to Ng axis of the first laser, Nm axis substantially parallel to Np axis of the first laser material and Ng axis substantially parallel to Nm axis of the first laser material; and a first laser diode and second laser diodes arranged to irradiate pump beams to the first laser material and the second laser material, respectively, wherein the first laser material is arranged to make a traveling direction of laser beams generated from the first and second laser materials be substantially parallel to Ng axis of the first laser material and to make a polarizing direction of laser beams generated from the first and second laser materials be substantially parallel to Np axis of the first laser material, and the second laser material is arranged to make a traveling direction of laser beams generated from the first and second laser materials be substantially parallel to Np axis of the second material and to make a polarizing direction of laser beams generated from the first and second laser materials be substantially parallel to Nm axis of the second laser material.

In another aspect of the present invention, a femtosecond laser apparatus includes a first laser material comprising Ng, Np and Nm axes spatially perpendicular to each other; a second laser material comprising Np axis substantially parallel to Ng axis of the first laser, Nm axis substantially parallel to Np axis of the first laser material and Ng axis substantially parallel to Nm axis of the first laser material; and a first laser diode and second laser diodes arranged to irradiate pump beams to the first laser material and the second laser material, respectively, wherein the first laser material is arranged to make a traveling direction of laser beams generated from the first and second laser materials be substantially parallel to Ng axis of the first laser material and to make a polarizing direction of laser beams generated from the first and second laser materials be substantially parallel to Nm axis of the first laser material, and the second laser material is arranged to make a traveling direction of laser beams generated from the first and second laser materials be substantially parallel to Np axis of the second material and to make a polarizing direction of laser beams generated from the first and second laser materials be substantially parallel to Nm axis of the second laser material.

In a further aspect of the present invention, a femtosecond laser apparatus includes a first laser material and a second laser material comprising Ng, Np and Nm axes, respectively, that are spatially perpendicular to each other, the first laser material and the second laser material facing each other; a first laser diode and a second laser diode arranged to make pump beams incident on the first laser material and the second laser material, respectively; and an optical component arranged between the first laser material and the second material to make a polarizing direction of laser beams generated from the first and second laser materials be substantially parallel to Np axis of the first laser material and to Nm axis of the second laser material, wherein the first laser material is arranged to make a traveling direction of laser beams generated from the first and second laser materials be substantially parallel to Ng axis of the first laser material, and the second laser material is arranged to make a traveling direction of laser beams generated from the first and second laser materials be substantially parallel to Np axis of the second laser material.

In a still further aspect of the present invention, a femtosecond laser apparatus includes a first laser material and a second laser material comprising Ng, Np and Nm axes, respectively, that are spatially perpendicular to each other, the first laser material and the second laser material facing each other; a first laser diode and a second laser diode arranged to make pump beams incident on the first laser material and the second laser material, respectively; and an optical component arranged between the first laser material and the second material to make a polarizing direction of laser beams generated from the first and second laser materials be substantially parallel to Nm axis of the first laser material and to Nm axis of the second laser material, wherein the first laser material is arranged to make a traveling direction of laser beams generated from the first and second laser materials be substantially parallel to Ng axis of the first laser material, and the second laser material is arranged to make a traveling direction of laser beams generated from the first and second laser materials be substantially parallel to Np axis of the second laser material.

In a still further aspect of the present invention, a femtosecond laser apparatus includes a first laser material and a second laser material facing each other; a first laser diode and a second laser diode arranged to make pump beams incident on the first laser material and the second laser material, respectively; and a beam dumper arranged between the first laser material and the second laser material, the beam dumper comprising a hole to pass laser beams generated from the first and second laser materials there through and a beam absorbing part formed adjacent to the hole to cut off or absorb the pump beams failed to be absorbed to the first and second laser materials.

Advantageous Effects

The embodiments have following advantageous effects. According to the femtosecond laser apparatus according to one embodiment of the present invention, the quality as well as the power intensity of the laser beams generated from the laser materials can be enhanced.

Furthermore, a pulse spectrum can be shaped as desired and the time width of the pulses may be reduced accordingly.

Still further, the gain spectrums of the laser materials having different wavelengths, respectively, corresponding to the maximum value of the emission cross section may be overcalled with each other. Accordingly, the spectrum width may be converted.

Still further, the alignment characteristic of pump beams and laser beams can be enhanced.

DETAILED DESCRIPTION

Reference may now be made in detail to specific embodiments, examples of which may be illustrated in the accompanying drawings. Wherever possible, same reference numbers may be used throughout the drawings to refer to the same or like parts.

Figure 1:
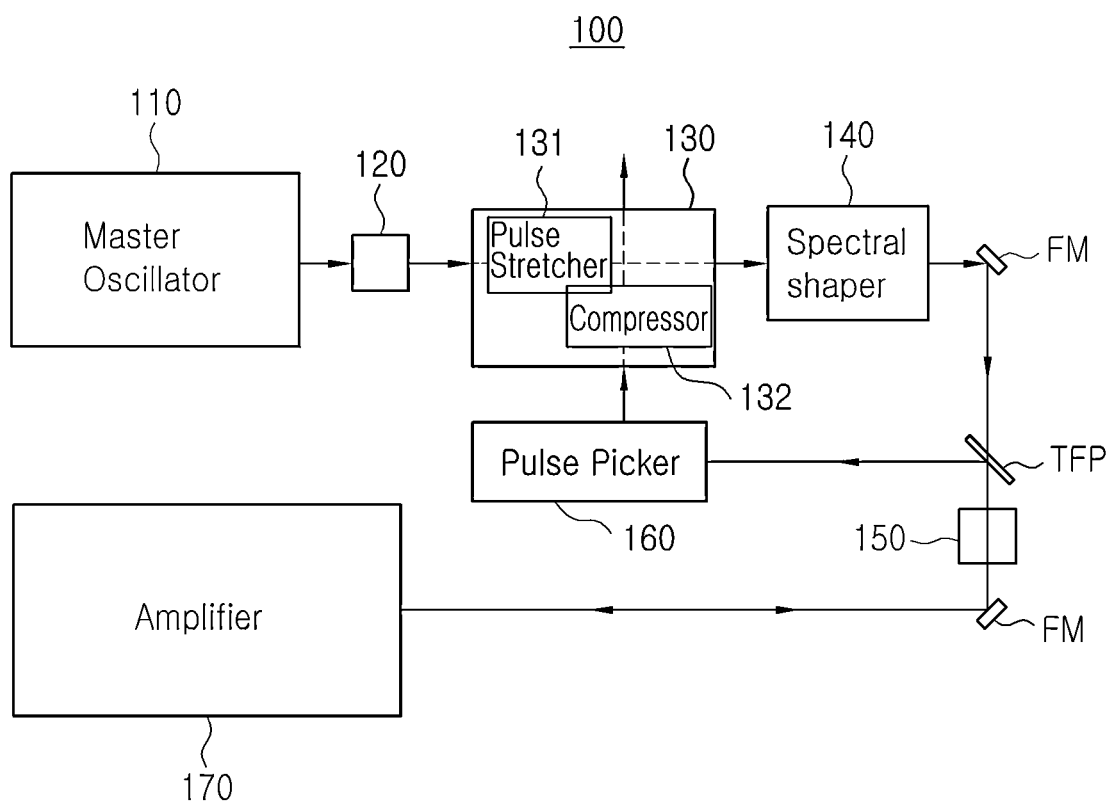
FIG. 1 is a schematic diagram illustrating a femtosecond laser system according to one embodiment of the present invention.

FIG. 1 is a schematic diagram illustrating a femtosecond laser system according to one embodiment of the present invention.

Referring to FIG. 1, a femtosecond laser system 100 may include a master oscillator 110, a faraday isolator 120, a pulse stretcher/compressor 130, a spectral shaper 140, a thin film polariscope (TFP), a faraday rotator 150, an amplifier 170 and a pulse picker 160.

The master oscillator 110 has a laser apparatus configured to generate a laser beam, similar to the amplifier 170, although not shown in the drawings. The master oscillator 110 may generate a femtosecond pulse at a femtosecond range.

The mater oscillator 110 may use an optical fiber laser or a solid laser to generate the laser beam. Various laser materials used in the solid laser may be selected and used according to thermal, optical and mechanical characteristics.

For example, the laser material may be a non-crystal material or crystal material. In case of using the crystal material as the laser material, at least one of an isotropic crystal and anisotropic crystal may be selected. Such anisotropic crystal may include a uniaxial crystal and biaxial crystal.

The non-crystal material may be Yb:Glass and the isotropic crystal of the crystal material may be at least one of Yb:TAG, Yb:ScO, Yb:LuO, Yb:LuScO and Yb:CaF. The uniaxial crystal may be at least one of Yb:CALGO, Yb:YVO4, Yb:NGW, Yb:NYW, Yb:LuVO, Yb:LSB, Yb:S-FAP and Yb:C-FAP. The biaxial crystal may be at least one of Yb:KYW, Yb:KGW, Yb:KLuW, Yb:YCOB and Yb:YAP.

The pulse stretcher/compressor 130 includes a stretcher 131 and a compressor 132 that are provided therein. The pulse stretcher/compressor 130 stretches a femtosecond pulse width generated by the master oscillator 110 or compresses a pulse amplified by the amplifier into a pulse in the femtosecond range again.

The stretcher 131 and the compressor 132 can stretch or compress the pulse by using an auxiliary spectral device. Examples of such a spectral device may include a grating.

In addition, the stretcher 131 and the compressor 132 may be integrally formed with each other to stretch and compress the pulse by sharing one spectral device. Accordingly, the size of the femtosecond laser system 100 may be compact and the production cost of the femtosecond laser system 100 can be reduced.

The stretcher 131 may temporally stretch the width of the femtosecond pulse generated by the master oscillator 110 and it may prevent physical damage to optical components including the laser material in that could be generated in a process of the amplifier 170 amplifying the femtosecond pulse.

For example, the stretcher 131 stretches a pulse of 100 femtosecond (fs) generated by the master oscillator 110 into a pulse of dozens of picosecond pulses (ps).

The compressor 132 compresses the pulse amplified by the amplifier 170 into a pulse in the femtosecond range and transmits the compressed pulse outside.

The faraday isolator 120 is arranged between the mater oscillator 110 and the pulse stretcher/compressor 130 and it prevents the high energy pulse generated by the amplifier 170 from being incident on the master oscillator 110.

The spectral shaper 140 converts a spectrum of the pulse stretched by the pulse stretcher 131 as desired. In other words, the spectral shaper 140 shapes a spectrum of seeding pulses input to the amplifier 170 and compensates the spectrum bandwidth narrowed in the amplification process of the amplifier. In this instance, the seeding pulses means the pulses applied to the amplifier 170 for pulse amplifying.

Such the spectral shaper 140 may be provided in the master oscillator 110 or the amplifier 170 or omitted in the femtosecond laser system 100, in case the mater oscillator 110 or the amplifier 170 converts the spectrum of the pulses as desired.

The spectrum shaping of the pulses will be described later.

The spectrum-shaped pulses are applied to the amplifier 170 after passing a full-reflection mirror (FM), the thin film polariscope (TFP) and the faraday rotator 150). At this time, the full reflection mirror (FM) is configured to change a passage of the beam and it can be provided or omitted according to the size and design conditions of the femtosecond laser system. In case the full reflection mirror (FM) is used like the embodiment of the present invention, the full reflection mirror (FM) can change the passage of the beam in a restricted space and the femtosecond laser system can be compact accordingly.

The amplifier 170 may include a laser beam generating device using an optical fiber laser or a solid laser, like the mater oscillator 110, and it may amplify the energy of the input seeding pulses by using the laser beam generating device.

A laser material used in the amplifier 170 may be the same laser material used in the mater oscillator 110 or different from that.

In other words, the laser material used in both of the mater oscillator 110 and the amplifier 170 may be various combinations of the crystal material and the non-crystal material. When both of the laser materials used in the mater oscillator 110 and the amplifier 170 are crystal material, various combinations of the isotropic crystal and the anisotropic crystal may be used.

A specific laser material that can be used in the amplifier 170 is substantially identical to the laser material that can be used in the mater oscillator 110 and detailed description thereof will be omitted.

The faraday rotator 150 is configured to rotate a polarizing direction of the laser pulse to change a passage of the traveling laser pulses amplified by the amplifier 170 toward the pulse picker 160 via the thin film polariscope (TFP).

The pulse picker 160 includes an electro-optic switch. While switching the electro-optic switch on and off, the pulse picker 160 distinguishes needed pulses and from needless pulses to pass them there through selectively. After that, the selected laser pulses compressed into femtosecond laser pulses in the femtosecond range by the compressor 132 and the femtosecond laser pulses may be emitted outside the femtosecond laser system.

The femtosecond laser system 100 according to the present invention amplifies and heightens the energy of the laser pulses in several nJ range generated in the oscillator 110 to make the laser pulses easily processed in the femtosecond laser processing.

Meanwhile, the laser material has a gain profile with a basically limited width. As an amplifying width is differentiated according to the wavelength of the pulses, the spectrum bandwidth of the amplified pulses could be narrowed and this is called as gain narrowing. Accordingly, there might be a problem of a broad time width of the pulses.

Figure 2:
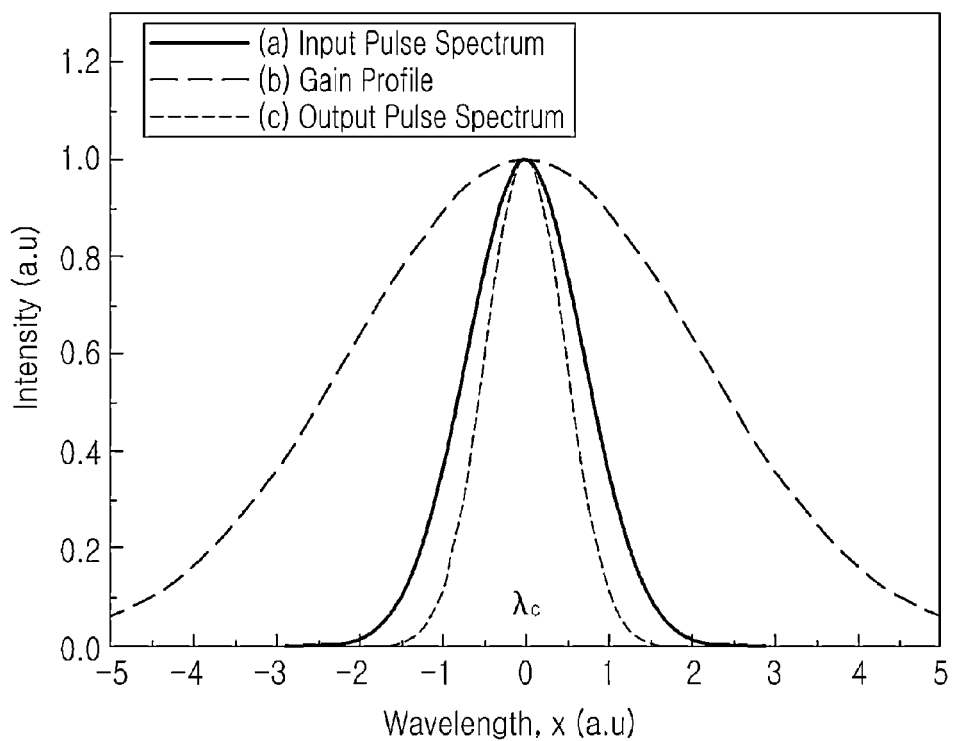
FIG. 2 is a graph to describe a spectrum characteristic as a gain of a amplified and output pulse is narrower according to one embodiment of the present invention.

FIG. 2 is a graph to describe a spectrum characteristic as a gain of an amplified and output pulse is narrower according to one embodiment of the present invention.

Referring to FIG. 2, an input pulse having a spectrum shown in (a) is applied to a laser material having a gain profile with a limited width. After that, in a process of amplifying the input pulse, amplification is continuous in a central wavelength ($\lambda c$) of the input pulse and a gain is lowered in an edge wavelength out of the center and the amplification rate is smaller in the edge wavelength than in the central wavelength.

In other words, when the input pulse reciprocates in a resonance cavity of the amplifier, the frequency of the input pulse passing the laser gain material is increased and a difference between amplification rates accumulates. Accordingly, the intensity of the input pulse is relatively lower in an edge wavelength than in a central wavelength.

As shown in the graph of FIG. 2, the width of the output pulse spectrum shown in (c) is getting narrower than the width of the input pulse spectrum.

When the spectrum bandwidth of the laser pulse is narrower, the time width of the laser pulse is wider. Accordingly, the heat is diffused in a mutual action between the laser beam output from the femtosecond laser system and a processing product and the processing result of the processed products can be deteriorated substantially.

Therefore, according to the embodiment of the present invention, before the seeding pulse is applied to the amplifier 170, the spectral shaper 140 is provided to shape the pulse to have a desired spectrum, to reduce the time width of the laser pulse. Or, an optical axis of the laser materials is changed in the mater oscillator 110 or the amplifier 170 to prevent the spectrum bandwidth from getting narrowed.

In addition, methods for widening the spectrum bandwidth of the pulse may include a method for widening the spectrum bandwidth of the pulse may include spatial dispersive amplification, spectrum converting after inserting an optical device in an resonance cavity, non-linear pulse compressing.

Figure 3:
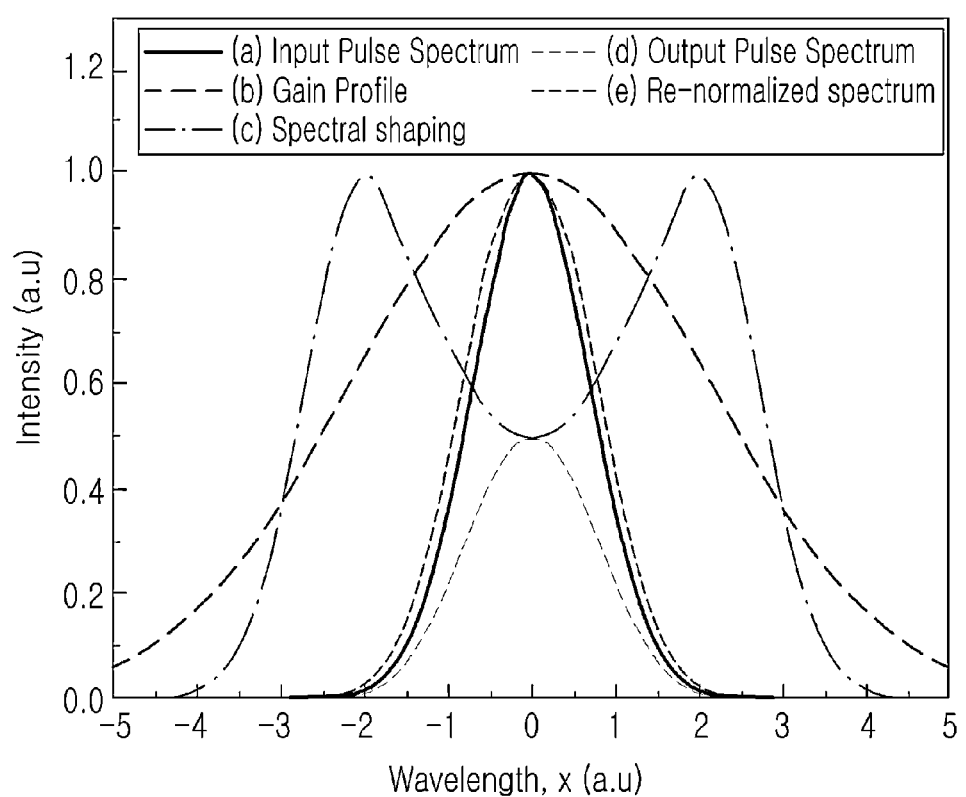
FIG. 3 is a graph to describe spectrum change of an output pulse according to spectrum shaping by using a spectral shaper.

FIG. 3 is a graph to describe spectrum change of an output pulse according to spectrum shaping by using a spectral shaper.

Referring to FIG. 3, spectrum shaping (SS) is performed to lower the intensity of an input pulse in a central wavelength shown in (c) and to heighten the intensity in a M-shape in a wavelength next to the central wavelength, before applying an input pulse having a spectrum shown in (a) to a laser material having a gain profile with a limited width shown in (b).

When such the pulse having the shaped spectrum is applied to the laser material having the gain profile shown in (b), the gain is low in the central wavelength and high in the wavelength near the central wavelength.

When the laser pulse reciprocates in a resonance cavity of the amplifier 170, the frequency of passages through the laser gain material increases and the differences of amplification rates accumulates only to realize the output pulse having the output pulse spectrum shown in (d).

The output pulse spectrum (d) is normalized and it is shown that the bandwidth (a) of the output spectrum is widened in comparison to the bandwidth (a) of the input pulse spectrum.

Meanwhile, to prevent the spectrum bandwidth from getting narrow, a plurality of laser materials may be provided in the laser generating device provided in the mater oscillator 110 or the amplifier 170, as well as the spectrum shaping of the pulse enabled by the spectral shaper. Unique gain spectrums possessed by the plurality of the laser materials, respectively, may be spectrally combined.

In other words, a wavelength corresponding to the maximum value of an emission cross-section makes different gain spectrums of the laser materials overlapped with each other, such that the spectrum bandwidth may be widened.

Figure 4:
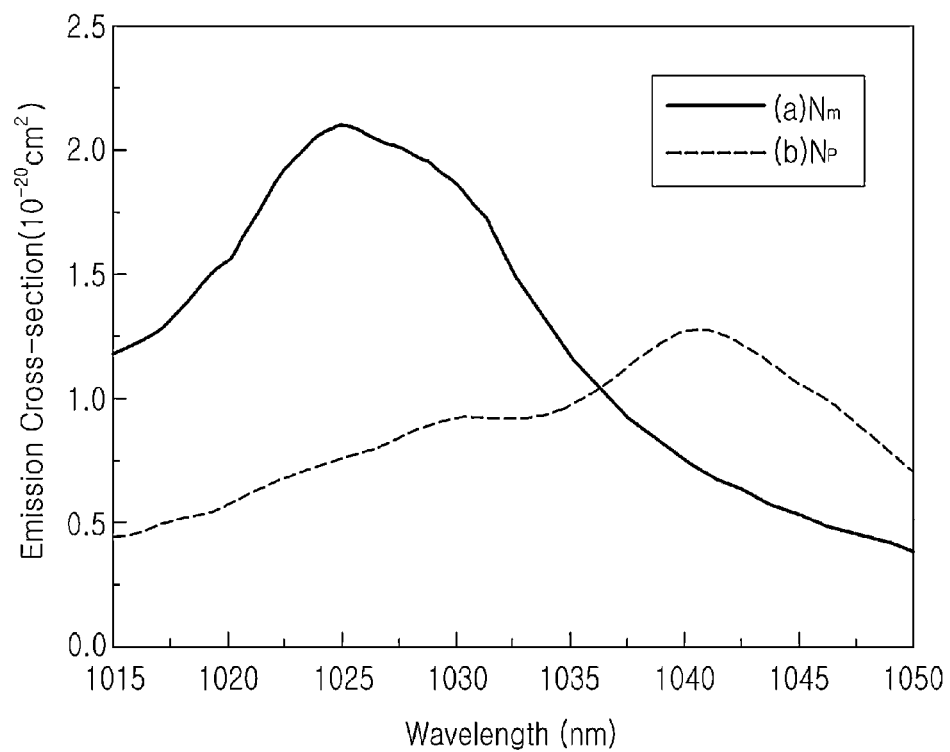
FIG. 4 is a diagram illustrating a spectrum characteristic of a emission cross section possessed by a laser crystal, when a polarizing direction of a laser beam generated from a laser crystal (Yb:KYW) is parallel to Nm-axis or Np-axis of the laser crystal (Yb:KYW)
Figure 5:
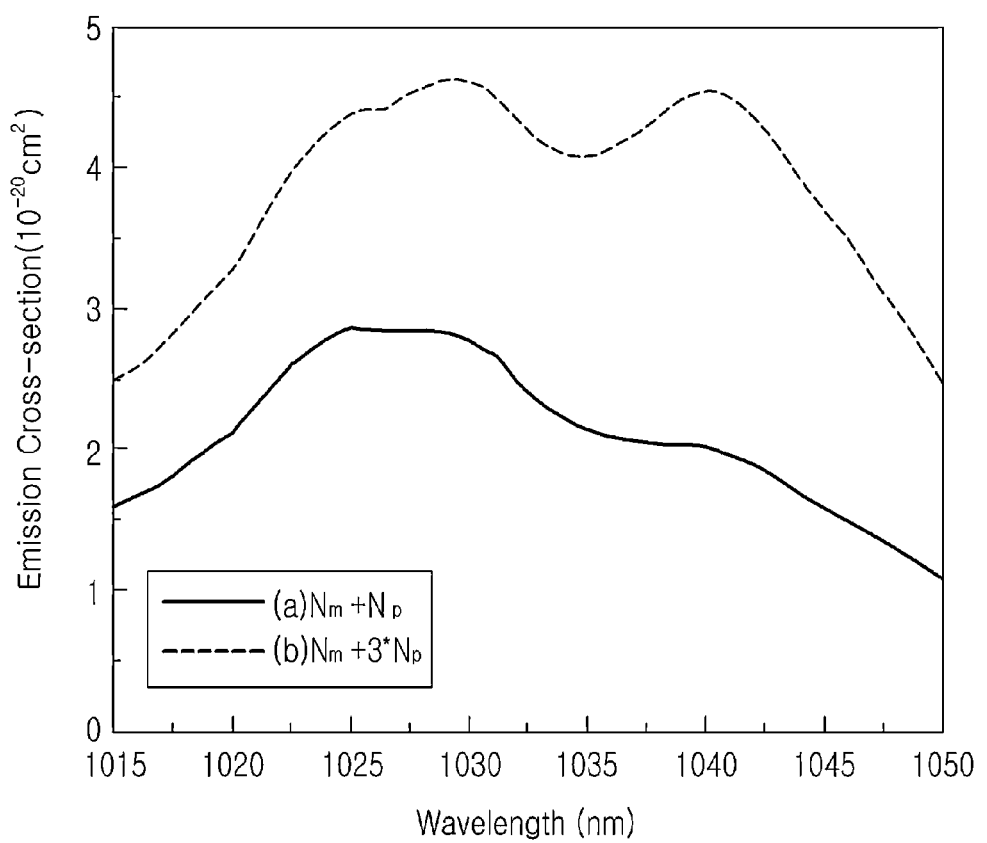
FIG. 5 is a diagram illustrating a spectrum characteristic shown by combining of a spectrum having a emission cross-section according to one embodiment of the present invention.

At this time, the laser materials may be one of non-crystal materials and crystal materials, non-crystal materials and non-crystal materials, crystal materials and crystal materials. The number of the laser materials is not limited and the crystal materials may include both of isotropic crystals and anisotropic materials. To widen the spectrum bandwidth of the pulse, the laser generating device may use the same types of laser materials as shown in FIGS. 4 and 5. Using characteristics of the spectrum of emission cross-section being differentiated according to an optical axis, the spectrums of the laser materials according to the optical axis are overlapped with each other and the spectrum bandwidth may be widened.

For example, in case the laser materials are anisotropic crystals including Yb:KYW or Yb:KGW, spectrums of emission cross sections are differentiated according to which axial direction a polarizing direction of laser beams generated from the anisotropic crystals is parallel to.

Experimentally, when a polarizing direction of laser beams in a wavelength range of 1015~1050 nm is substantially parallel to Nm axis of the laser crystal with respect to optical axes including Nm, Np and Ng of the Yb:KYW laser crystals, the emission cross section is the maximum. The emission cross section is larger when the polarizing direction is substantially parallel to Np-axis and approximately 10 times smaller when the polarizing direction is substantially parallel to Ng-axis, than when it is substantially parallel to Nm-axis.

Such experiments use crystallographic axes including a-axis, b-axis and c-axis in widening the spectrum bandwidth of the pulse, not the optical axes.

FIG. 4 is a diagram illustrating a spectrum characteristic of a emission cross section possessed by a laser crystal, when a polarizing direction of a laser beam generated from a laser crystal (Yb:KYW) is parallel to Nm-axis or Np-axis of the laser crystal (Yb:KYW). FIG. 5 is a diagram illustrating a spectrum characteristic shown by combining of a spectrum having an emission cross-section according to one embodiment of the present invention.

Referring to FIG. 4, when the polarizing direction of the laser beams generated from the laser crystals (Yb:KYW) is substantially parallel to Nm-axis of the laser crystal (Yb:KYW), the emission cross section has the maximum value near a wavelength of 1025 nm and spectrum distribution of (a) is shown. When the polarizing direction of the laser beams generated from the laser crystals (Yb:KYW) is substantially parallel to Np-axis of the laser crystal (Yb:KYW), the emission cross section has the maximum value near a wavelength of 1040 nm and spectrum distribution of (b) is shown.

Referring to FIG. 5, (a) shows that the bandwidth of the spectrum is increased by combining the spectrums of the emission cross sections shown in (a) and (b) of FIG. 4 with each other at 1:1 ratio. (b) shows that the spectrums of the emission cross sections shown in (a) and (b) of FIG. 4 are combined with each other at 1:3 ratio to increase the spectrum bandwidth of the emission cross section farther.

FIG. shows one of examples for increasing the spectrum bandwidth of the emission cross section. Alternatively, spectral characteristics of different emission cross sections are combined diversely so as to increase the spectrum bandwidth. At this time, the spectrum combining may uses an optical axis having a large value of emission cross section to enhance the power of the laser beams generated from the laser crystals.

Meanwhile, the emission cross sections and absorption cross sections of Yb:KYW or Yb:KGW laser crystals are different according to a specific one of axial directions. Polarizing directions of pump beams may be combined variously to enhance the light pumping efficiency.

Preferably, an absorption cross section of Ng-axis direction is 10 times smaller than an absorption cross section of Nm-axis direction and the absorption direction of Nm-axis direction is approximately 5 times larger than that of NP-axis direction, such that the polarizing direction of the pump beam may be substantially parallel to Nm-axis of the laser crystal.

Figure 6:
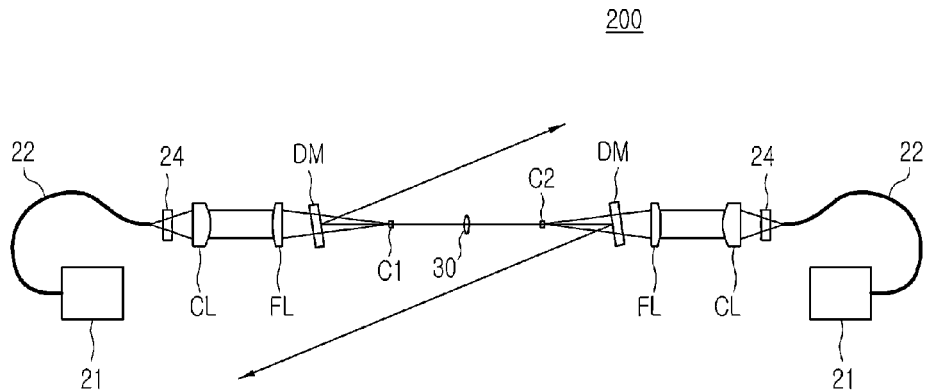
FIG. 6 is a schematic diagram of a laser beam generating apparatus according to one embodiment of the present invention.

FIG. 6 is a schematic diagram of a laser beam generating device according to one embodiment of the present invention.

As shown in the drawing, a laser beam generating apparatus 200 may be provided in the mater oscillator (not shown). The laser beam generating apparatus 200 may include a laser material (C1 and C2), a dichromatic mirror (DM), a focusing lens (FL), a collimating lens (CL), a first wave plate 24, a laser diode 21, an optical fiber 22 and a beam dumper 30.

Laser diodes 21 are arranged on both sides of the laser material (C1 and C2) and each of the laser diodes 21 is optically connected with the optical fiber 22. Such the laser diode 21 is a light source configured to generate a pump beam and it applies the pump beam to the laser material (C1 and C2) via the optical fiber 22.

The type of the laser material (C1 and C2) and the arrangement structure of the laser material (C1 and C2) may be combined variously, considering spectrum properties, thermal properties, efficiency and power of pulses.

The first wave plate 24 is a half-wave plate (λ/2) and it is arranged next to the optical fiber 22 along a passage of the pump beam. The first wave plate 24 may adjust a polarizing direction of the light generated in the laser diode 21.

The collimating lens (CL) and the focusing lens (FL) are sequentially arranged next to the first wave plate 41 along the passage of the pump beams and it connect the pump beam polarized in the first wave plate 24 to the laser material (C1 and C2).

The dichromatic mirror (DM) reflects the laser beam generated from the laser material (C1 and C2) and transmits the pump beam generated from the laser diode (C1 and C2) there through. For that, the dichromatic mirror (DM) is arranged in front and behind the laser materials (C1 and C2).

Meanwhile, although not shown in the drawing, the first wave plate 24, the collimating lens (CL), the focusing lens (FL), the dichromatic mirror (DM), the laser materials (C1 and C2) may be integrally fabricated as a light pumping module via mechanical component connection to allow the pump beam generated from the laser diode to maintain an alignment characteristic of the beams incident on the laser materials even if the temperature or humidity changes, for example.

The beam dumper 30 may be arranged between the laser materials (C1 and C2) to prevent deterioration of the alignment of the pump beams and beam lasers generated in the process of amplifying laser pulses. The beam dumper will be described in detail later.

Moreover, optical components for adjusting the beam passage, for example, a concave mirror, a convex mirror, a full reflection mirror and the like are further provided in the laser generating apparatus, to adjust the passage of the laser beam.

Figure 7:
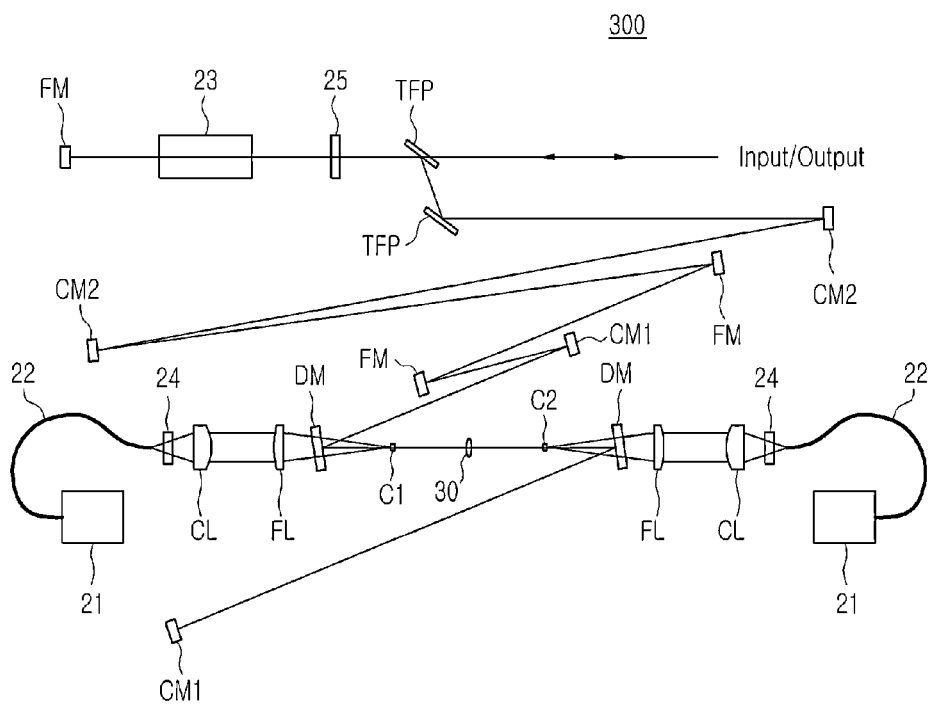
FIG. 7 is a schematic diagram of a laser beam generating apparatus according to another embodiment of the present invention.

FIG. 7 is a schematic diagram of a laser beam generating apparatus according to another embodiment of the present invention.

As shown in the drawing, a laser beam generating apparatus 300 may be provided in an amplifier (not shown). The laser beam generating apparatus 300 includes a laser material (C1 and C2), a dichromatic mirror (DM), a focusing lens (FL), a collimating lens (CL), a first wave plate 24, a second wave plate 25, a thin film polariscope (TFP), a concave mirror (CM1 and CM2), a full reflection mirror (FM), a laser diode 21, an optical fiber 22, a pockels cell 23 and a beam dumper 30.

The laser beam generating apparatus has a structure almost similar to the structure of the laser beam generating apparatus shown in FIG. 6. Accordingly, detailed description of similar optical components will be omitted.

The concave mirror (CM1 and CM2) and the full reflection mirror (FM) are configured to convert a passage of laser beams. The number and positions of the concave mirror (CM1 and CM2) and the full reflection mirror (FM) may be differentiated according to the scale of the laser beam generating apparatus or the traveling distance of the beam passage. In the embodiment of the present invention, only the concave mirror and the full reflection mirror are described as beam passage converting means. A convex mirror, a plane mirror and other beam passage converting means may be used.

The pockels cell 23, the second wave plate 25 and the thin film polariscope (TFP) are arranged in a light passage direction and they are employed as switches to emit the laser beams generated from the laser material outside. here, the second wave plate 25 is a λ/4-wave plate. For example, several kV voltages are applied to the pockels cell to convert a polarizing direction of the laser beam amplified via the optical components.

Figure 8:
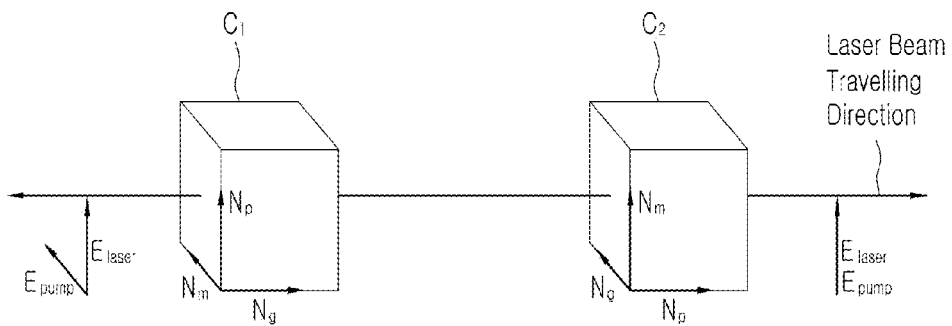
FIG. 8 is an optical conceptual diagram of a femtosecond laser apparatus to describe an arrangement structure of a laser material provided in a laser beam generating apparatus of a maser oscillator or an amplifier according to one embodiment of the present invention.

FIG. 8 is an optical conceptual diagram of a femtosecond laser apparatus to describe an arrangement structure of a laser material provided in a laser beam generating apparatus of a maser oscillator or an amplifier according to one embodiment of the present invention.

As shown in the drawing, first and second laser materials (C1 and C2) have crystal faces based on optical axes, respectively, and each of the crystal faces is formed perpendicular to the optical axis. In other words, the first and second laser materials (C1 and C2) have the crystal faces having Ng, Np and Nm axes spatially perpendicular to each other, respectively. The first laser material (C1) and the second laser material (C2) are aligned differently.

Moreover, the second laser material (C2) may be provided in the laser beam generating apparatus, with Np-axis substantially parallel to Ng-axis of the first laser material (C1), Nm-axis substantially parallel to Np-axis of the first laser material (C1) and Ng-axis substantially parallel to Nm-axis of the first laser material (C1).

Although not shown in the drawing, a first and second laser diodes are arranged adjacent to the first laser material (C1) and the second laser material (C2), respectively, to allow the pump beams incident on the first and second laser materials (C1 and C2).

The first laser material (C1) and the second laser material (C2) are arranged to allow a traveling direction of the laser beams generated from the first laser material (C1) and the second laser material (C2) substantially parallel to Ng-axis of the first laser material and substantially parallel to Np-axis of the second laser material (C2).

As mentioned above, the first laser material (C1) and the second material (C2) makes the polarizing direction (namely, Elaser) of the laser beams generated from the first laser material (C1) and the second material (C2) be substantially parallel to Np-axis of the first laser material (C1) and Nm-axis of the second material (C2), while it is resonating in the laser beam generating apparatus. Accordingly, the laser beams are traveling in different axial directions of the laser materials having different thermal characteristics, such that the quality of the beams can be enhanced, without beam distortion generated by thermal effects.

In addition, to enhance the efficiency, the first laser material (C1) and the second laser material (C2) may be arranged to make a polarizing direction (Epump) of first pump beams generated from the first laser diode be substantially parallel to Nm-axis of the first laser material (C1) and a polarizing direction (Epump) of second pump beams generated from the second laser diode be substantially parallel to Nm-axis of the second laser material (C2).

In other words, the polarizing direction of the laser beams generated from the first laser material (C1) and the second laser material (C2) may be substantially parallel to one Nm-axis of the first and second laser materials (C1 and C2), considering an emission cross section, and substantially parallel o the other Np-axis. Accordingly, the spectrum bandwidth may be broadened and the beam distortion generated by the thermal effect may be prevented. Also, the polarizing direction (Epump) of the pump beams generated from the first and second diodes may be substantially parallel to Nm-axes of the first and second laser materials (C1 and C2), with the maximum absorption cross section, only to enhance the efficiency.

According to one embodiment of the present invention, two laser materials are provided to firstly complement the thermal characteristics of the laser materials to enhance the beam quality. Different gain spectrum distributions are combined to broaden the bandwidth. However, three or more laser materials may be provided to broad the bandwidth farther to reduce the time width of the pulses. The arrangement of the laser materials and the laser system including the laser materials may be varied freely in any types.

Figure 9A:
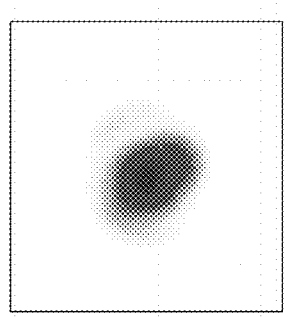
FIGS. 9A-9C are diagrams illustrating laser beam characteristics experimentally shown according to the arrangement structure of the laser material.
Figure 9B:
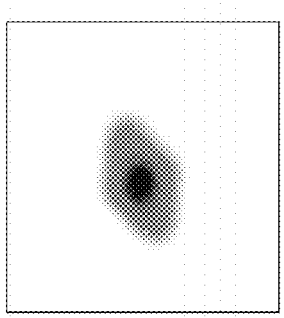
Figure 9C:
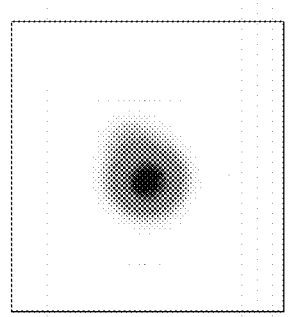

FIGS. 9A-9C are diagrams illustrating laser beam characteristics experimentally shown according to the arrangement structure of the laser material.

In common experimental conditions of FIGS. 9A-9C, the size of the laser material is identical as 2×2×5 mm3 and a doping rate of Yb is 3%. An output pulse power is 13~15 W and a polarizing direction of a pump beam is substantially parallel to Nm-axes of the first laser material and the second laser material.

Based on such common experimental conditions, according to FIG. 9A, in case of the first laser material, a traveling direction of the laser beam is substantially parallel to Ng-axis of the first laser material and a polarizing direction (Elaser) of the laser beam is substantially parallel to Np-axis of the first laser material. Similar to the first laser material, the second laser material has beam characteristics generated when a traveling direction of a laser beam is substantially parallel to Ng-axis of the second laser material and a polarizing direction (Elaser) of a laser beam is substantially parallel to Nm-axis of the second laser material. As shown in the drawing, the shape of the laser beam is oval, with beam distortion, and the beam quality might be deteriorated accordingly.

According to FIG. 9A, in case of the first laser material, a traveling direction of the laser beam is substantially parallel to Ng-axis of the first laser material and a polarizing direction (Elaser) of the laser beam is substantially parallel to Nm-axis of the first laser material. Similar to the first laser material, the second laser material has beam characteristics generated when a traveling direction of a laser beam is substantially parallel to Np-axis of the second laser material and a polarizing direction (Elaser) of a laser beam is substantially parallel to Nm-axis of the second laser material. As shown in the drawing, the shape of the laser beam is oval, with beam distortion, and the beam quality might be deteriorated accordingly.

According to FIG. 9C, in case of the first laser material, a traveling direction of the laser beam is substantially parallel to Ng-axis of the first laser material and a polarizing direction (Elaser) of the laser beam is substantially parallel to Np-axis of the first laser material. Similar to the first laser material, the second laser material has beam characteristics generated when a traveling direction of a laser beam is substantially parallel to Np-axis of the second laser material and a polarizing direction (Elaser) of a laser beam is substantially parallel to Nm-axis of the second laser material. As shown in the drawing, the shape of the laser beam is almost circular, without the beam distortion, and the beam quality might be enhanced accordingly.

Meanwhile, it is preferred that a femtosecond laser having a high average power is used, considering a processing object material, environments of productive sites and stability of a laser system. Accordingly, the arrangement structure of laser materials may be differentiated to enhance the average power as shown in FIG. 10.

Figure 10:
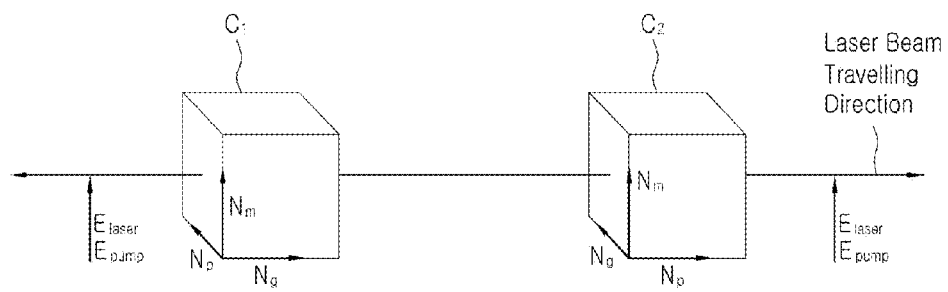
FIG. 10 is an optical conceptual diagram of a femtosecond laser apparatus to describe an arrangement structure of a laser material to enhance an average power of a laser beam according to another embodiment of the present invention.

FIG. 10 is an optical conceptual diagram of a femtosecond laser apparatus to describe an arrangement structure of a laser material to enhance an average power of a laser beam according to another embodiment of the present invention.

FIG. 10 is similar to the optical conceptual diagram of FIG. 8 illustrating the femtosecond laser apparatus. In other words, a second laser material (C2) may be arranged in a laser beam generating apparatus and the second laser material (C2) includes Np-axis substantially parallel to Ng-axis of the first laser material (C1), Ng-axis substantially parallel to Np-axis of the first laser material (C1) and Nm-axis substantially parallel to Nm-axis of the first laser material (C1).

The first laser material (C1) and the second laser material (C2) are arranged to make a traveling direction of the laser beams generated from the first laser material (C1) and the second laser material (C2) be substantially parallel to Ng-axis of the first laser material and substantially parallel to Np-axis of the second laser material (C2). Also, the first laser material (C1) and the second laser material (C2) may be arranged to make a polarizing direction (Elaser) of the laser beam be substantially parallel to Nm-axes of the first laser material (C1) and the second laser material (C2), respectively.

In other words, the first laser material (C1) and the second laser material (C2) are arranged to increase emission cross sections of the first and second laser materials (C! and C2) and to enhance the average output of the beams.

At this time, the first laser material (C10 and the second laser material (C2) may be arranged to make a polarizing direction (Epump) of a pump beam be substantially parallel to Nm-axes of the first and second laser materials (C1 and C2). Accordingly, an absorption cross section for absorbing the pump beam generated from a laser diode may be increased and laser beam generation efficiency may be enhanced.

A femtosecond laser apparatus according to one embodiment of the present invention shown in FIG. 10 may use three or more laser materials, similar to the embodiment of FIG. 8.

Figure 11:
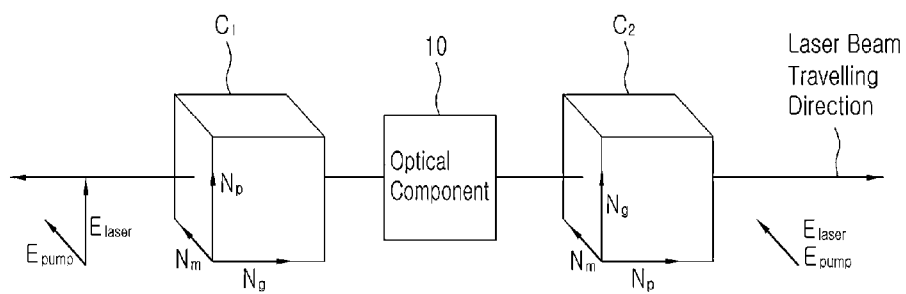
FIG. 11 is an optical conceptual diagram of another embodiment of the femtosecond laser apparatus to describe an arrangement structure of a laser material provided in a laser beam generating apparatus of a maser oscillator or an amplifier according to one embodiment of the present invention.

FIG. 11 is an optical conceptual diagram of another embodiment of the femtosecond laser apparatus to describe an arrangement structure of a laser material provided in a laser beam generating apparatus of a maser oscillator or an amplifier according to one embodiment of the present invention.

The optical conceptual diagram of the femtosecond laser apparatus shown in FIG. 11 is similar to the optical conceptual diagram shown in FIG. 8 and detailed description of identical characteristics will be omitted accordingly.

As shown in FIG. 11, an optical component 10 may be arranged between a first laser material (C1) and a second laser material (C2). The optical component 10 is arranged to make a polarizing direction of a laser beam generated from the first laser material (C1) and the second laser material (C2) be substantially parallel to Np-axis of the first laser material and Nm-axis of the second laser material (C2).

In other words, the optical component 10 may make the polarizing direction of the laser beam be substantially parallel to a specific optical axis of the laser material, to convert a spectrum bandwidth of the laser beam and to prevent beam distortion generated by a thermal effect of the laser material.

At this time, the optical component 10 may include any types of components configured to convert the polarizing direction of the beam. Examples of the optical component 10 may include a polarization converter. Such a polarization converter includes half-wave plates, double Fresnel rhombs, broadband prismatic rotator, faraday rotator and combination of mirrors.

Meanwhile, detailed description of laser beam generation efficiency, output compensation and the number of laser materials are identical to the description of the optical conceptual diagram shown in FIG. 8, and the detailed description thereof will be omitted accordingly.

Meanwhile, similar to the embodiment of FIG. 10, the polarizing direction of the laser beam is adjusted by using the optical component, only to the average output of the beam can be enhanced.

Figure 12:
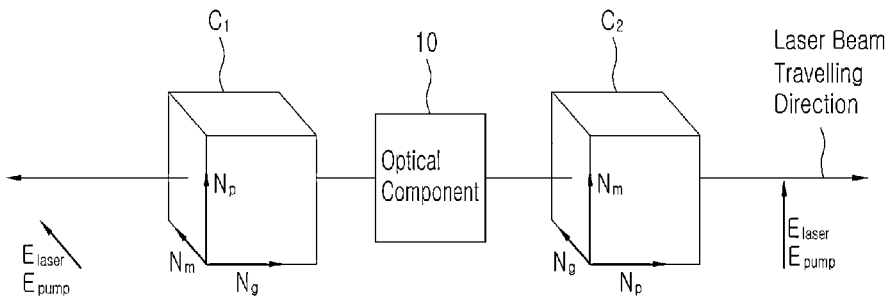
FIG. 12 is an optical conceptual diagram of the embodiment of the femtosecond laser apparatus to describe an arrangement structure of a laser material provided in a laser beam generating apparatus of a maser oscillator or an amplifier according to another embodiment of the present invention.

FIG. 12 is an optical conceptual diagram of the embodiment of the femtosecond laser apparatus to describe an arrangement structure of a laser material provided in a laser beam generating apparatus of a maser oscillator or an amplifier according to another embodiment of the present invention.

The optical conceptual diagram of the femtosecond laser apparatus shown in FIG. 12 is similar to the optical conceptual diagram of FIG. 10, and description of identical elements will be omitted accordingly.

As shown in FIG. 12, an optical component 10 may be arranged between a first laser material (C1) and a second laser material (C2). The optical component 10 is arranged to make a polarizing direction of a laser beam generated from the first laser material (C1) and the second laser material (C2) be substantially parallel to Nm-axis of the first laser material and Nm-axis of the second laser material (C2).

The optical component 10 may make the polarizing direction of the laser beam be substantially parallel to a specific optical axis of the laser material, to increase emission cross section of the laser materials to enhance an average output of the beams.

At this time, the type and other characteristics of the optical component 10 are identical to those of the optical component 10 according to the embodiment of FIG. 11.

Figure 13:
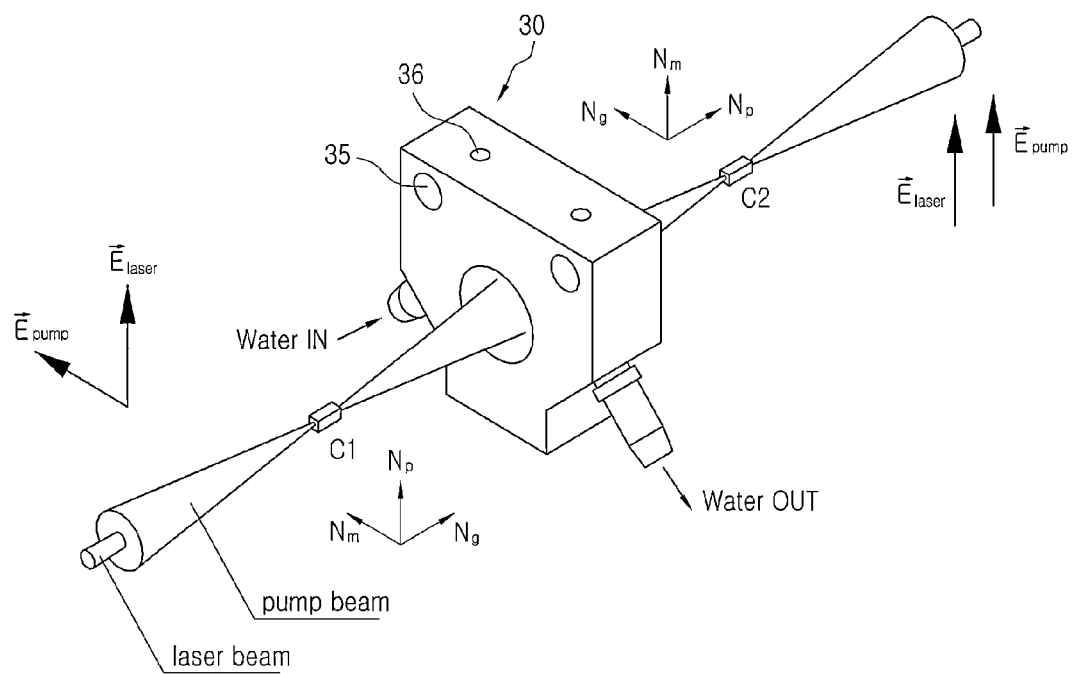
FIG. 13 is a diagram illustrating a laser beam generating apparatus provided in a master oscillator or amplifier according to one embodiment of the present invention.
Figure 14A:
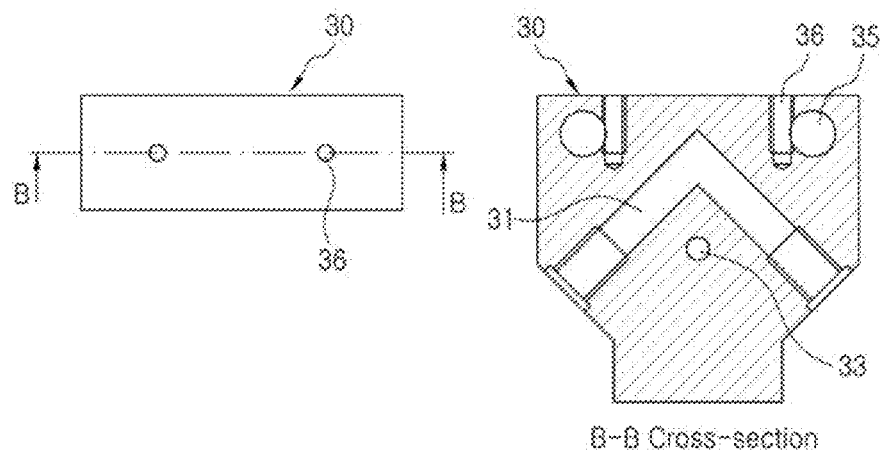
FIGS. 14A and 14B are diagrams illustrating beam dumpers according to one embodiment of the present invention.
Figure 14B:
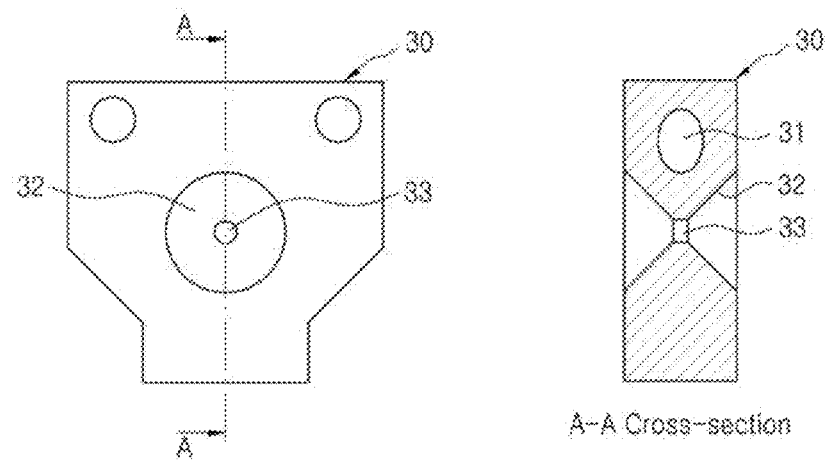

FIG. 13 is a diagram illustrating a laser beam generating apparatus provided in a master oscillator or amplifier according to one embodiment of the present invention. FIGS. 14A and 14B are diagrams illustrating beam dumpers according to one embodiment of the present invention. FIG. 14A is a plane diagram of a beam dumper and a partial sectional diagram. FIG. 14B is a front diagram of the beam dumper and a partial sectional diagram.

Referring to FIGS. 13, 14A and 14B, a laser beam generating apparatus 200 includes a first laser material (C1) and a second laser material (C2) that are arranged, facing each other, and a beam dumper 30 arranged between the first laser material (C1) and the second laser material (C2).

The beam dumper 30 includes a hole 33 formed in a central portion thereof and a beam absorbing part 32 arranged adjacent to the hole 33.

The hole 33 of the beam dumper is configured to pass a laser beam generated from the first and second laser materials there through. The beam absorption part 32 of the beam dumper is configured to cut off or absorb pump beams failed to be absorbed to the first laser material (C1) and the second laser material (C2).

The pump beams generated from a laser diode (not shown) are absorbed to the first and second laser materials (C1 and C2) and the other pump beams failed to be absorbed thereto are incident on an optical component (not shown) composing the laser apparatus and a mount (not shown) supporting the optical component. Accordingly, thermal distortion is generated in an overall portion of the laser apparatus and the beam alignment characteristic might be deteriorated.

The beam dumper 30 according to the embodiment of the present invention absorbs pump beams failed to be absorbed to the first laser material (C1) or the second laser material (C2) to prevent them from heating components composing the laser apparatus. Accordingly, the deterioration of the beam alignment characteristic may be prevented.

In addition, a cold water channel 31 may be formed in the beam dumper 30 to prevent the heat generated from the absorbed pump beams from being transmitted to neighboring areas. Cold water is supplied to the beam dumper 30 via the cold water channel 31 to chill the beam dumper 30. In addition, the cold water channel 31 may be longitudinally formed, arranged adjacent to the beam absorbing part 32 as closely as possible, to enhance chilling efficiency.

An insertion hole 25 may be formed in an upper portion of the beam dumper 30 to insert connection means therein and the connection means may be integrally coupled to an optical component or an optical mount that composes the laser generating apparatus.

In case of it is mechanically connected with the other optical components, such the beam dumper 30 can prevent thermal distortion of the optical components generated in the process of generating or amplifying femtosecond pulses. In other words, the heat of the optical components generated by the pump beams may be transmitted and absorbed to the beam dumper such that the thermal distortion of the optical components can be prevented.

A screw fastening hole 36 may be formed in an upper lateral end of the beam dumper 30 to fasten the beam dumper 30 to the connection means, in communication with an optical mount (not shown).

The cold water channel 31 may be formed adjacent to the hole 33 or along a circumference of the beam absorbing part 32 to enhance chilling efficiency.

The beam absorbing part 32 has a shape with a predetermined diameter getting reduced toward a central portion from both lateral ends of the beam dumper 30. In other words, the beam absorbing part 32 has a cone cross section to prevent the pump beam generated from the laser diode from being incident on and reflected by the beam dumper 30. The beam absorbing part 32 may have any structures only if they can allow the beam dumper to reduce reflectance of the pump beam.

Moreover, a surface of the beam absorbing part 32 may be anodized or coated with a material having a high beam absorption coefficient, to enhance a beam absorption coefficient.

Next, an experimental embodiment using the femtosecond laser apparatus according to the present invention and the femtosecond laser system including the femtosecond laser apparatus will be described as follows.

Experimental Embodiment

The femtosecond master oscillator 110 is fabricated to generate seeding pulses which will be applied to an amplifier 170.

At this time, the mater oscillator 110 is fabricated of a Yb:KYW laser material having the size of 3×3×2 mm3 and a Yb doping ratio of 5 at. %

A polarizing direction of the pump beam is substantially parallel to Nm-axis of the laser material and an oscillation polarizing direction of a laser is also substantially parallel to Nm-axis.

To make a central wavelength of the oscillating femtosecond mater oscillator 110 fitted to a central wavelength of a resonance cavity provided in an amplifier 170, the laser material may be Np-cut of the laser material in an Np-axis direction.

The central wavelength of the laser beam output from the mater oscillator 110 is 1035 nm and the spectrum bandwidth of the laser beam is 9.0 nm. The pulse time width of the laser beam is 110 fs and the average output of the laser beam is 1.2 W.

The pulse stretcher 131 is a device configured to temporally stretch the length of the pulse before the pulse is amplified by the amplifier 170. The pulse compressor 132 is a device configured to return the longitudinally stretched time width of the pulse to the short time width of the pulse in the femtosecond range.

Once the pulse having the time width longitudinally stretched hundreds of or thousands of times or more is amplified by the amplifier 170 in such a chirp pulse amplification process, a peak power of the amplified pulse is lowered and physical damage to the optical components composing the resonance cavity of the amplifier 170 may be prevented.

Moreover, the temporal shape distortion of the pulse and the spatial distribution distortion of the beam can be prevented may be prevented by a non-linear phenomenon and examples of such a non-linear phenomenon include a self-focusing effect generated in a high peak power.

This experiment uses one transmission diffraction grating having a groove density of 1500 lines/mm designed and fabricated to be employed as the pulse stretcher 131 and the pulse compressor 132 simultaneously.

The results of a test performed for the pulse stretcher 131 and the pulse compressor 132 by using the femtosecond pulse of the mater oscillator 110 will be as follows.

The femtosecond pulse having a time width of 110 fs is stretched into a pulse of approximately 50 ps by the pulse stretcher 131. When the stretched pulse passes the pulse compressor 132, the pulse is compressed into a pulse of 160 fs.

A compression rate showing a rate of the pulse time width before stretched to the pulse time width after stretched is 1.45. In addition, a power conversion efficiency of the pulse between before and after passing the pulse stretcher 131 is 74% and a power conversion efficiency of the pulse between before and after passing the pulse compressor 132 is 78%.

Only desired ones of the pulses emitted outside can pass the pulse picker 160.

At this time, the pulse picker 160 divides main pulses into pre-pulses and post-pulses.

Meanwhile, two thin film polariscopes are provided in the amplifier 170 to enhance a relative contrast ratio between laser pulses desired to emit outside the resonance cavity and weak laser pulses leak out of the resonance cavity.

An auxiliary thin film polariscope is arranged in an entire system to enhance the final contrast ratio.

The amplifier 170 uses a Yb:KYW laser material having a size of 2×2×5 mm3 and a Yb3+ ion doping concentration of 3 at. %. Non-coating with respect to the pump beam and the laser oscillation wavelength is performed on both ends of the laser material.

A dichromatic plane mirror (DM) is coated to pass pump beams in a wavelength range of 981 nm there through at a high transmittance and to reflect lasers in a wavelength range of 1 micrometer at a high reflectance.

As the pump beam source, two laser diodes 21 having a high brightness with a wavelength of 981 nm and the maximum power of 70 W are arranged in the laser materials (C1 and C2), respectively.

Yb:KYW used in this experiment is an anisotropic laser material that has different characteristics according to an optical axial direction.

Accordingly, the optical fiber 22 connected to the laser diode 21 is shortened as much as possible to maintain a polarizing direction of the pump beam.

This experiment uses a high brightness laser diode 21 having a length of 30 cm, a core diameter of 200 μm and a numerical aperture (NA) of 0.22.

To make the pump beams absorbed to the laser material as many as possible, a half-wave plate λ/2 is arranged next to the optical fiber 22 to adjust the polarizing direction microprecisely, such that the polarization of the pump beam may be substantially parallel to Nm-axis of Yb:KYW crystal.

The laser material (C1) is Ng-cut cut in an Ng-axial direction and a polarizing direction of the pump beam is substantially parallel to Nm-axis and a polarizing direction of the laser beam is substantially parallel to Np-axis.

The laser material (C2) is Np-cut cut in an Np-axial direction and a polarizing direction of the pump beam is substantially parallel to Nm-axis and a polarizing direction of the laser beam is also substantially parallel to Nm-axis.

In other words, the polarizing directions of the pump beams are substantially parallel to Nm-axis having the largest absorption cross section. One polarizing direction of the laser beam is substantially parallel to Nm-axis having the largest emission cross section and the other one is substantially parallel to Np-axis, to combine different gain spectrums with each other.

The combination between one Ng-cut laser material and the other Np-cut laser material makes laser oscillation combine different gain spectrum distributions, such that the bandwidth may be increased to pulse a shorter femtosecond pulse and that the polarizing directions of the laser beams may be toward axial directions having different terminal characteristics. Accordingly, distribute the thermal effect.

The length of the laser material is 5 mm that is relatively long and the doping rate is 3 at. %, to reduce a thermal lens effect and to enhance a spatial quality of the output beams.

According to experimental results supporting that, there may be used LASCAD software (Las-CAD GmbH) capable of implementing numerical simulation of power characteristics by configuring a resonance cavity virtually. For example, a thermal lens of and an optical strength of a thermal-mechanical stress on Yb:KYW laser crystal having a length of 5 mm and a doping rate of 3 at. % may be 1.5 times weaker than a thermal lens of and an optical strength of a thermal-mechanical stress on a laser crystal having a length of 3 mm and a doping rate of 5 at. %

Moreover, computer calculating shows the astigmatism of the Ng-cut crystal is similar to that of the Np-cut crystal and that the axial direction of the Ng-cut crystal is different from that of the Np-cut crystal.

When the power of the pump beam applied to the laser material is 36 W, a ratio between thermal focus distances in x-axis and y-axis directions (fx/fy) is 1.15 in case of the Ng-cut and 0.88 in case of the Np-cut.

That means that the astigmatism of the amplified beams can be partially balanced in case the laser beam passes the Ng-cut crystal and the Np-cut crystal serially or in case the laser beam passes the Np-cut crystal and the Ng-cut crystal serially.

Meanwhile, in the experiment according to the embodiment of the present invention, the doping concentration of Yb is preset as a specific value. However, the Yb doping concentration may be in a range of 1~10 at. % where the power intensity of the laser beam and the quality of the laser beam can be enhanced.

Next, experimental results of a femtosecond laser apparatus and a femtosecond laser system including the femtosecond laser apparatus according to one embodiment of the present invention will be described as follows.

Experimental Results

Figure 15:
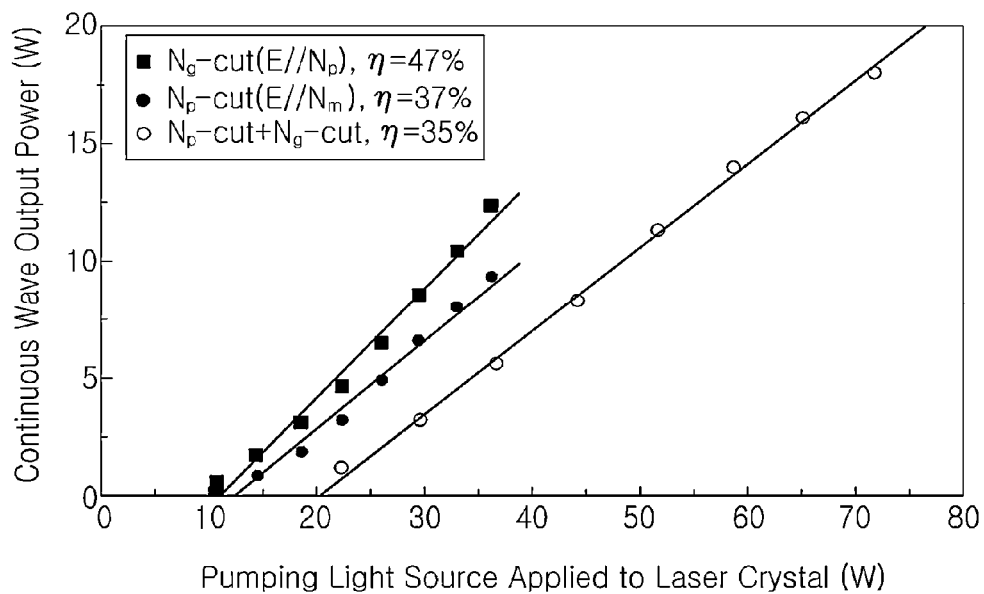
FIG. 15 is a graph illustrating slope efficiency of a continuous wave according to the intensity of a pump beam applied to a laser material according to one embodiment of the present invention.

FIG. 15 shows operational characteristics of a continuous wave (CW) output power according to an incident pump power on crystals of FIG. 7.

First of all, a pump beam is applied to only of laser materials having Ng-cut and Np-cut and slope efficiencies are 47% and 37%, respectively.

At this time, when the applied pump beam is 36 W, the maximum powers are 12 W and 9 W.

When pump beams are applied to the laser materials having Ng-cut and Np-cut, the slop efficiency is approximately 35%. When the applied pump beam is 72 W, a continuous wave power of an amplifier 170 is 18 W.

When a gate time is 800 ns and a pulse repetition rate is 200 kHz in Q-switch mode, an average power of 16 W is gained.

The reason why the power is reduced, compared with a continuous wave mode, is that the power loss is generated by an optical switch arranged in a resonance cavity.

The pulse time width is approximately 20 ns and the pulse spectrum bandwidth is approximately 16 nm.

The pulse spectrum shows an M-shape having two peaks of 1035 nm and 1043 nm according to different gain peaks possessed by two laser materials.

The spectrum narrowing is generated in a process of amplifying the pulse energy performed by the amplifier 170. To restrain the spectrum narrowing and to broaden the spectrum bandwidth, a polarization-interference filter called 'Lyot filter' is provided to perform spectral shaping is performed in an extra-cavity or intra-cavity.

Figure 16:
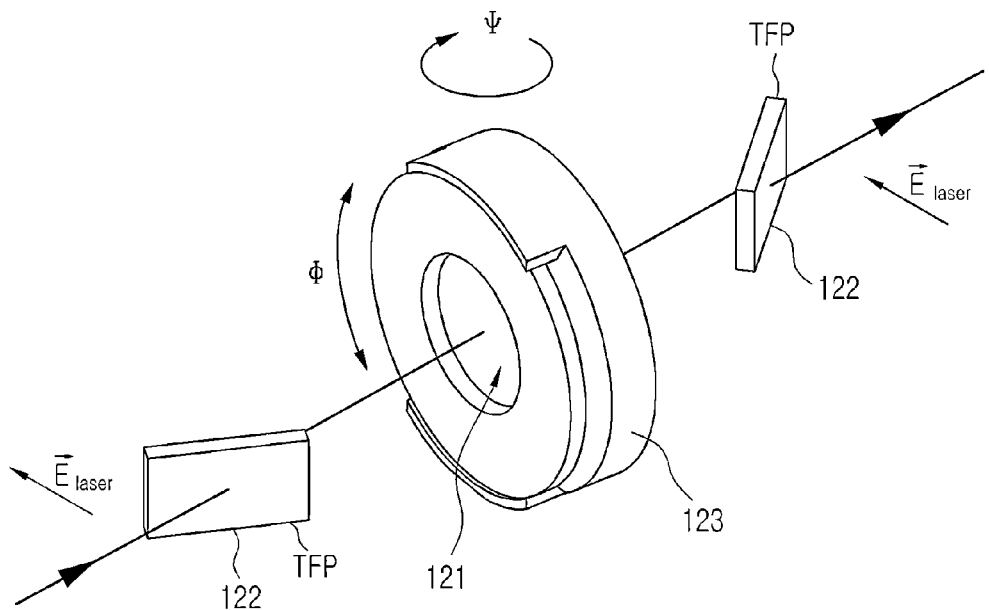
FIG. 16 is an optical conceptual diagram illustrating a spectrum shaping machine according to one embodiment of the present invention.

Meanwhile, a spectral shaper 140 is configured of two polarizing plates 122 and a birefringent quartz plate 121 arranged between the polarizing plates 122 as shown in FIG. 16.

The minimum transmittance point of the birefringent filter has to correspond to the maximum point of the gain spectrum and the widths thereof have to be similar to each other.

To realize that, a quartz plate having a thickness of 8 mm is cut along an optical axis and the cut quartz plate is mounted to a rotation mount 123 to rotate in $\Phi$ and $\Psi$ rotational directions precisely, such that the position and the modulation depth of the minimum transmittance point may be adjusted.

Lastly, a seeding pulse having the pulse stretching and the spectrum shaping is applied to the amplifier 170 and the overall system shown in FIG. 1 is configurated. After that, operational characteristics of the system are measured.

Figure 17:
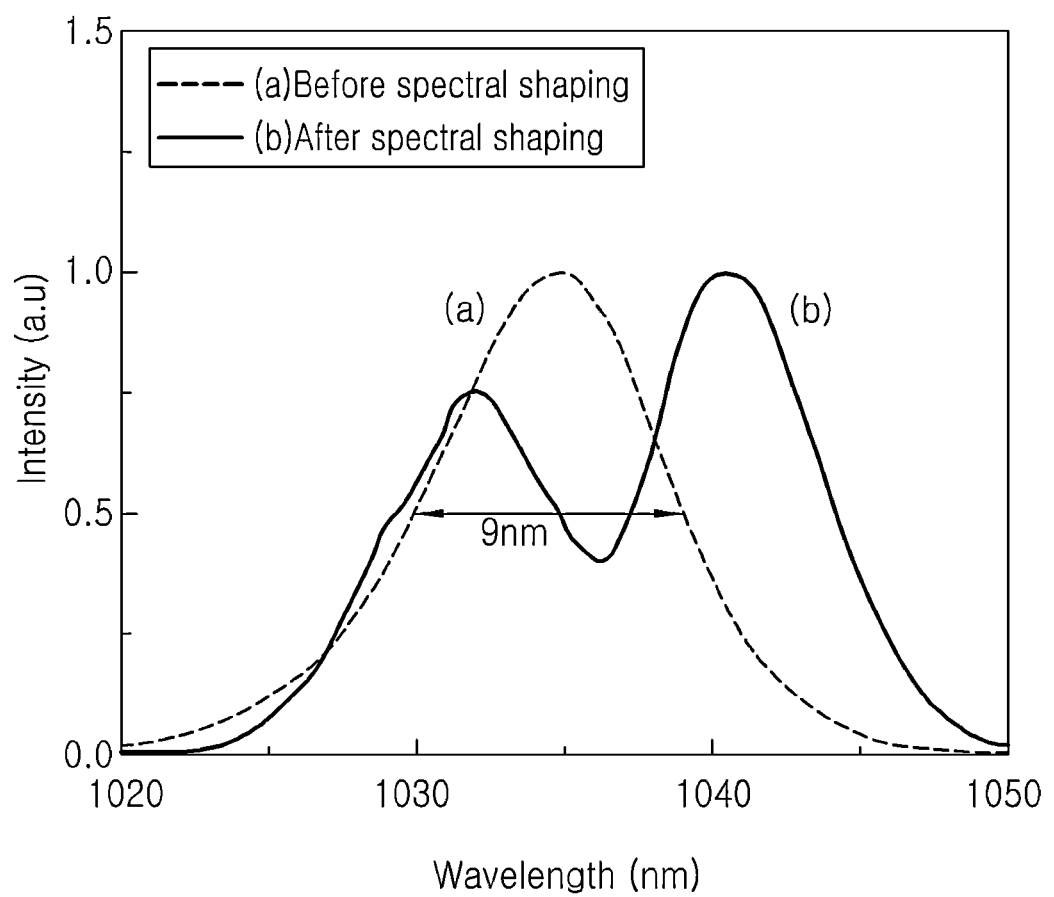
FIG. 17 is a graph illustrating a spectrum before and after spectrum-shaping a seeding pulse according to one embodiment of the present invention.

FIG. 17 is a graph illustrating a spectrum before (a) and after (b) spectrum-shaping a pulse chirped by the pulse stretcher 131 according to one embodiment of the present invention.

The pulse emitted from the mater oscillator 110 of FIG. 1 has a symmetrical spectrum having a central wavelength of 1035 nm and a bandwidth of 9 nm.

After spectrum-shaping, a local maximum value is calculated near 1030 nm and 1040 nm.

The thickness and rotational direction ($\Phi$ and $\Psi$) of the quartz plate composing the spectral shaper 140 are adjusted and various spectrum shaping types are possible.

Figure 18:
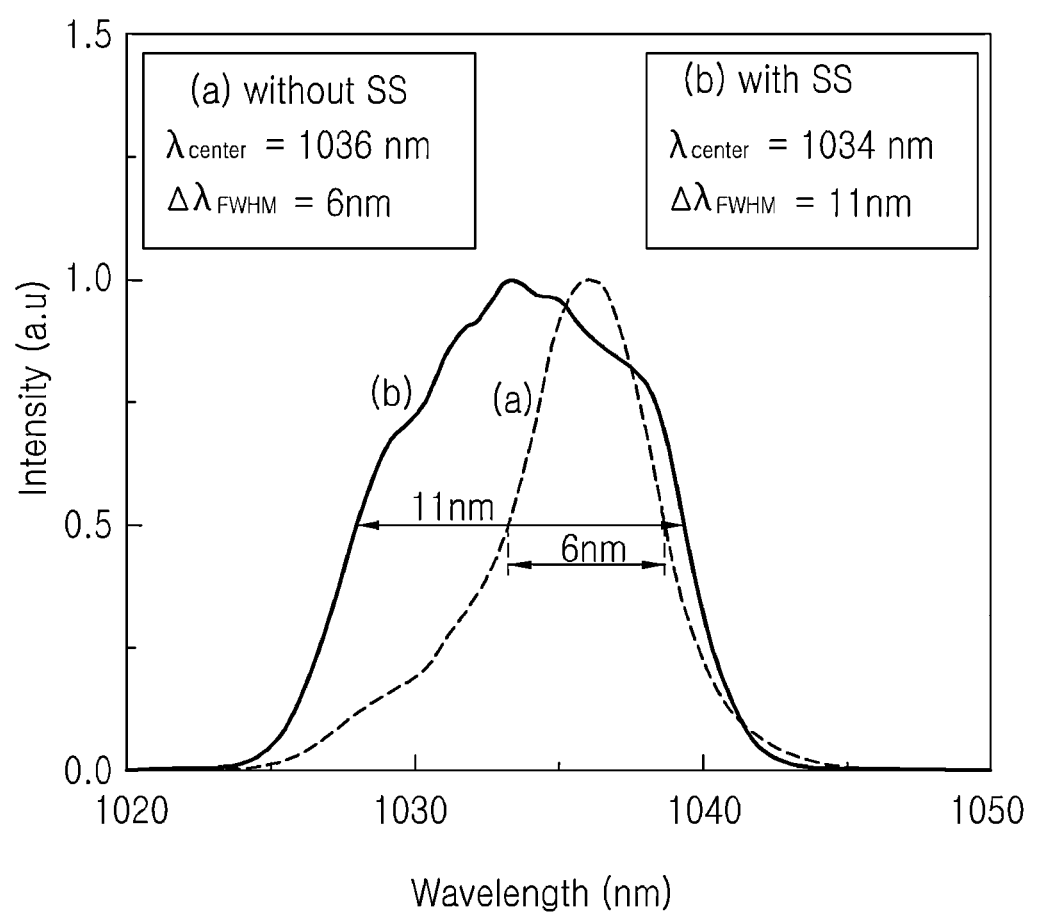
FIG. 18 is a graph illustrating a spectrum of a pulse amplified and not spectrum-shaping and a pulse amplified and spectrum-shaped according to one embodiment of the present invention.

(a) of FIG. 18 shows a non-symmetrical spectrum having a central wavelength of 1036 nm and a bandwidth of 6 nm that is a measured spectrum of a laser pulse amplified when a seeding pulse not spectrum-shaped is applied to an amplifier 170 and when pump beams having the same intensity to laser crystals (C1 and C2) at a pulse repetition rate of 200 kHz.

Compared with (a) of FIG. 17 showing a pulse spectrum before amplified, the spectrum bandwidth is narrowed from 9 nm to 6 nm by the gain narrowing.

Figure 19:
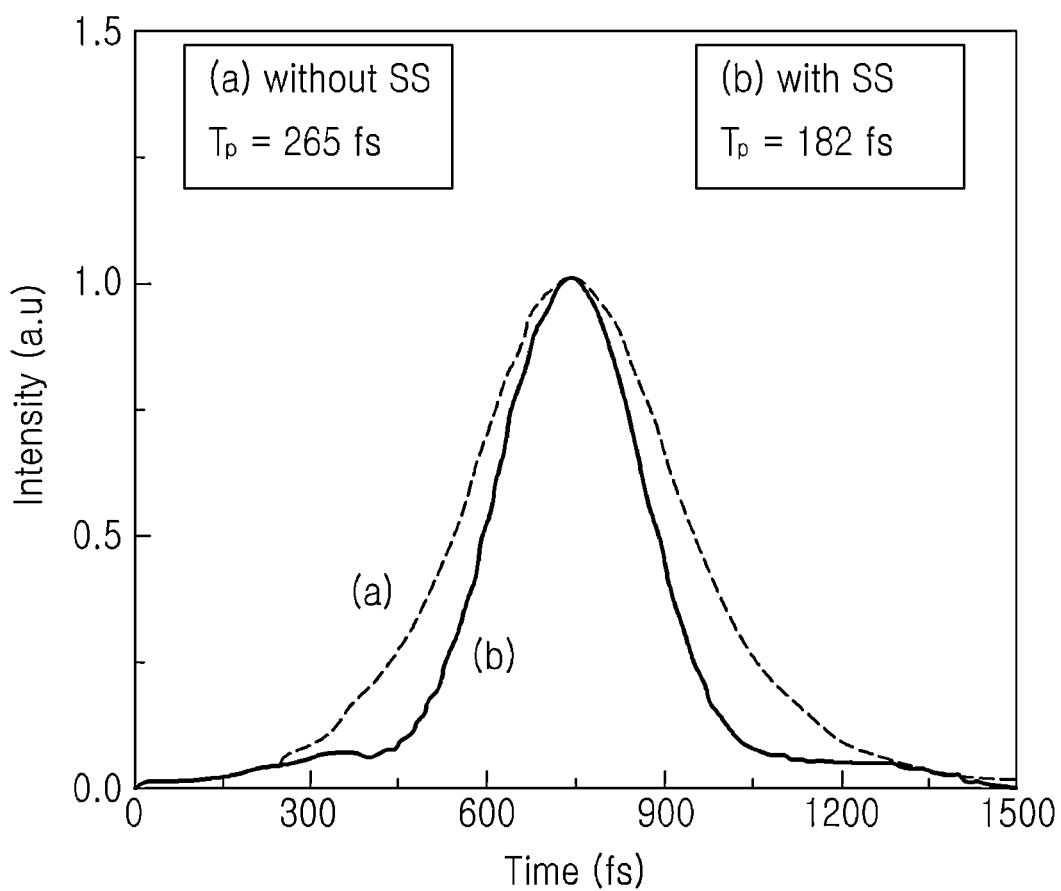
FIG. 19 is a graph illustrating a pulse time width of a pulse amplified and not spectrum-shaping and a pulse amplified and spectrum-shaped according to one embodiment of the present invention.

When the narrowed spectrum pulse is compressed by a pulse compressor 132, the pulse time width measured as 265 fs as shown in (a) of FIG. 19.

Such the spectrum narrowing may be retrained by various methods.

For example, pump beams having different intensities, respectively, are applied to C1 and C2 of Yb:KYW that is an anisotropic laser crystal, the pump beams have different maximum gain values at central wavelengths only to gain an effect of combining gain spectrums having different intensities.

In an actual experiment, a rate of pump beam powers applied to Np-cut crystal and Ng-cut crystal is changed into 3:2, the spectrum may be broadened and the shape of the spectrum may be distorted.

In this instance, the spectrum bandwidth is 9 nm and the pulse time width is 210 fs. Then, the narrowed pulse time width can be gained. However, the intensity of the pump power is limited and an overall power of the femtosecond laser system is limited disadvantageously.

This experiment measures that the power is reduced by 37% under the conditions mentioned above.

A further method for retraining the spectrum narrowing is to use spectrum-shaping. The spectral shaper 140 shown in FIG. 16 is arranged between the pulse stretcher 131 and the amplifier 170 shown in FIG. 1, to implement spectrum shaping of the seeding pulse in an extra-resonance cavity.

An angle ($\Phi$ and $\Psi$) of a rotation mount 123 is precisely adjusted and the spectrum of the amplified pulse and the time width of the pulse are measured to determine an optimal angle.

(b) of FIG. 18 shows a spectrum of a laser pulse amplified when a seeding pulse is spectrum-shaped.

The measured spectrum has a bell shape, with a central wavelength of 1034 nm and a spectrum band width of 11 nm.

The band width of the amplified pulse is 6 nm before spectrum-shaping and the band width is 11 nm after the spectrum-shaping, which is almost twice larger. When the broadened spectrum pulse is compressed by a pulse compressor 132, the measured pulse time width is 182 fs as shown in (b) of FIG. 19.

The experiment is performed when the spectral shaper 140 is arranged in a resonance cavity of the amplifier 170.

The spectrum having almost the same area can be gained and the laser power is reduced approximately 20%.

That is because small loss generated by the spectral shaper 140 having a Lyot filter accumulates while a laser pulse reciprocates within the resonance cavity.

Figure 20:
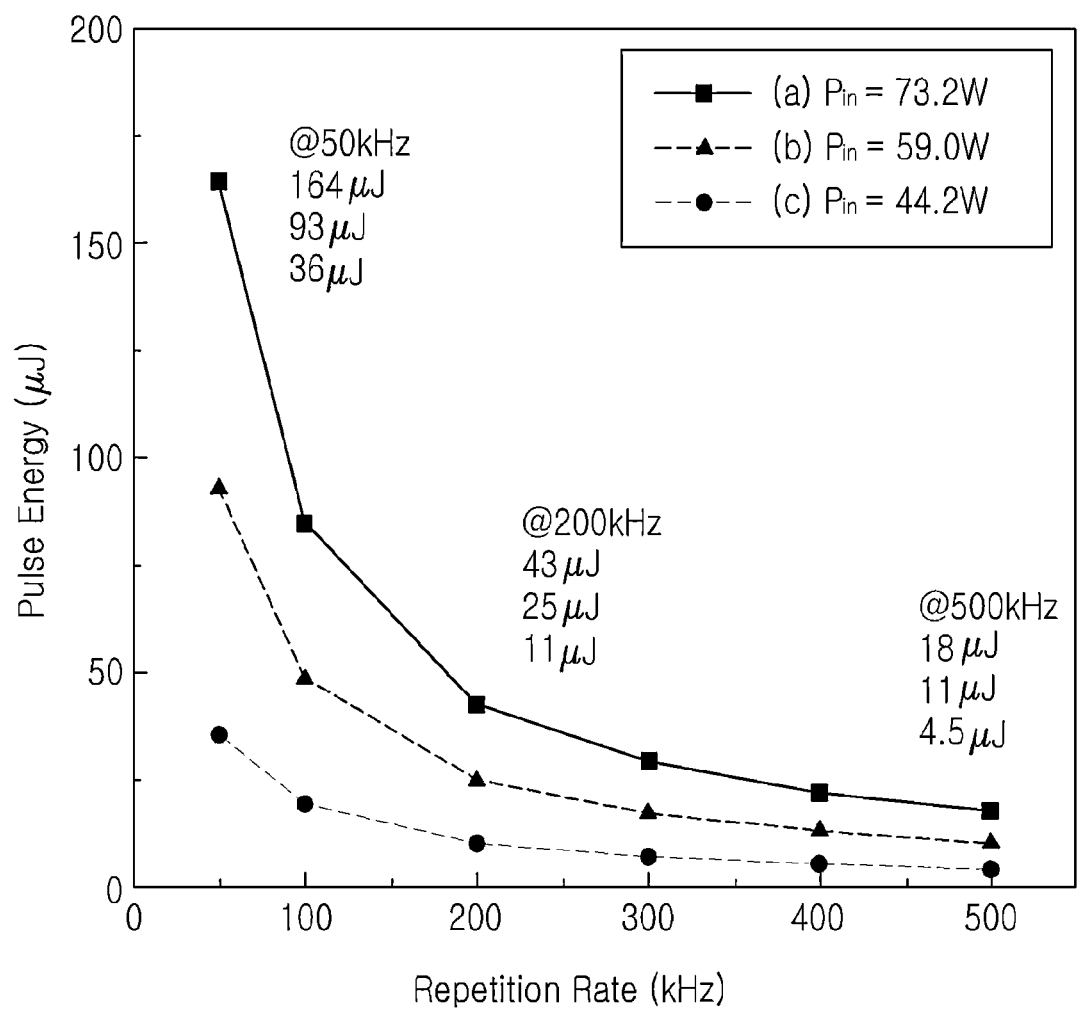
FIG. 20 is a graph illustrating change in pulse energy according to a pulse repetition rate.

FIG. 20 is a diagram illustrating pulse energy change according to a pulse repetition rate.

As the pulse repetition rate is getting lower, the pulse energy is getting higher. The maximum pulse energy measured when the pump power applied to the laser crystal is 73.2 W and the pulse repetition rate is 50 kHz may be 165 µJ.

In the experiment, it is observed that Raman scattering generated at a lower pulse repetition rate and Raman scattering may be a factor interfering with enhancement of pulse energy.

A pulse energy of 10~15 µJ is gained at a pulse repetition rate of 200 kHz and a pulse energy of 4~20 µJ is gained at a pulse repetition rate of 500 kHz.

Such the pulse energy is sufficient to process various sample materials at a high pulse repetition rate.

Various variations and modifications of the femtosecond laser apparatus and the femtosecond laser system including the femtosecond laser apparatus are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A femtosecond laser apparatus comprising:
a first laser material comprising Ng, Np and Nm axes spatially perpendicular to each other;
a second laser material comprising Np axis substantially parallel to Ng axis of the first laser material, Nm axis substantially parallel to Np axis of the first laser material and Ng axis substantially parallel to Nm axis of the first laser material; and a first laser diode and second laser diodes arranged to irradiate pump beams to the first laser material and the second laser material, respectively, wherein the first laser material is arranged to make a traveling direction of laser beams generated from the first and second laser materials be substantially parallel to Ng axis of the first laser material and to make a polarizing direction of laser beams generated from the first and second laser materials be substantially parallel to Np axis of the first laser material, and the second laser material is arranged to make a traveling direction of laser beams generated from the first and second laser materials be substantially parallel to Np axis of the second material and to make a polarizing direction of laser beams generated from the first and second laser materials be substantially parallel to Nm axis of the second laser material.

2. The femtosecond laser apparatus according to claim 1, wherein each of the first and second laser materials is at least one of Yb:KYW, Yb:KGW, Yb:KLuW, Yb:YCOB and Yb:YAP.

3. The femtosecond laser apparatus according to claim 2, wherein an Yb doping concentration of Yb:KYW, Yb:KGW, Yb:KLuW, Yb:YCOB and Yb:YAP is 1~10 at. %.

4. The femtosecond laser apparatus according to claim 1, wherein the first laser material is configured to make a polarizing direction of a first pump beam generated from the first laser diode be substantially parallel to Nm axis of the first laser material, and the second laser material is configured to make a polarizing direction of a second pump beam generated from the second laser diode be substantially parallel to Nm axis of the second laser material.

5. A femtosecond laser apparatus comprising:

a first laser material comprising Ng, Np and Nm axes spatially perpendicular to each other;

a second laser material comprising Np axis substantially parallel to Ng axis of the first laser, Ng axis substantially parallel to Np axis of the first laser material and Nm axis substantially parallel to Nm axis of the first laser material; and a first laser diode and second laser diodes arranged to irradiate pump beams to the first laser material and the second laser material, respectively, wherein the first laser material is arranged to make a traveling direction of laser beams generated from the first and second laser materials be substantially parallel to Ng axis of the first laser material and to make a polarizing direction of laser beams generated from the first and second laser materials be substantially parallel to Nm axis of the first laser material, and the second laser material is arranged to make a traveling direction of laser beams generated from the first and second laser materials be substantially parallel to Np axis of the second material and to make a polarizing direction of laser beams generated from the first and second laser materials be substantially parallel to Nm axis of the second laser material.

6. A femtosecond laser system comprising:

a master oscillator configured to generate a pulse in a femtosecond range;

a pulse stretcher configured to stretch a width of the generated pulse;

an amplifier configured to amplify an energy of the stretched pulse; and a pulse compressor configured to compress the amplified pulse into a pulse in a femtosecond range, wherein at least one of the master oscillator and the amplifier comprises the laser apparatus recited in claim 1.

7. The femtosecond laser system according to claim 6, wherein the pulse stretcher and the pulse compressor are integrally formed via one spectral device commonly shared by the pulse stretcher and the pulse compressor.

8. The femtosecond laser system according to claim 6, further comprising:

a spectral shaper configured to shape a spectrum of the stretched pulse.

9. A femtosecond laser apparatus comprising:

a first laser material and a second laser material comprising Ng, Np and Nm axes, respectively, that are spatially perpendicular to each other, the first laser material and the second laser material facing each other;

a first laser diode and a second laser diode arranged to make pump beams incident on the first laser material and the second laser material, respectively; and an optical component arranged between the first laser material and the second material to make a polarizing direction of laser beams generated from the first and second laser materials be substantially parallel to Np axis of the first laser material and to Nm axis of the second laser material, wherein the first laser material is arranged to make a traveling direction of laser beams generated from the first and second laser materials be substantially parallel to Ng axis of the first laser material, and the second laser material is arranged to make a traveling direction of laser beams generated from the first and second laser materials be substantially parallel to Np axis of the second laser material.

10. The femtosecond laser apparatus according to claim 9, wherein the optical component is one of half-wave plates, double Fresnel rhombs, broadband prismatic rotator, faraday rotator and combination of mirrors.

11. The femtosecond laser apparatus according to claim 9, wherein each of the first and second laser materials is at least one of Yb:KYW, Yb:KGW, Yb:KLuW, Yb:YCOB and Yb:YAP.

12. The femtosecond laser apparatus according to claim 11, wherein an Yb doping concentration of Yb:KYW, Yb:KGW, Yb:KLuW, Yb:YCOB and Yb:YAP is 1~10 at. %.

13. The femtosecond laser apparatus according to claim 9, wherein the first laser material makes a polarizing direction of a first pump beam generated from the first laser diode be substantially parallel to Nm axis of the first laser material, and the second laser material makes a polarizing direction of a second pump beam generated from the second laser diode be substantially parallel to Nm axis of the second laser material.

14. A femtosecond laser apparatus comprising:

a first laser material and a second laser material comprising Ng, Np and Nm axes, respectively, that are spatially perpendicular to each other, the first laser material and the second laser material facing each other;

a first laser diode and a second laser diode arranged to make pump beams incident on the first laser material and the second laser material, respectively; and an optical component arranged between the first laser material and the second material to make a polarizing direction of laser beams generated from the first and second laser materials be substantially parallel to Nm axis of the first laser material and to Nm axis of the second laser material, wherein the first laser material is arranged to make a traveling direction of laser beams generated from the first and second laser materials be substantially parallel to Ng axis of the first laser material, and the second laser material is arranged to make a traveling direction of laser beams generated from the first and second laser materials be substantially parallel to Np axis of the second laser material.

15. A femtosecond laser system comprising:
a master oscillator configured to generate a pulse in a femtosecond range;
a pulse stretcher configured to stretch the width of the generated pulse;
an amplifier configured to amplify an energy of the stretched pulse; and
a pulse compressor configured to compress the amplified pulse into a pulse in the femtosecond range,
wherein at least one of the master oscillator and the amplifier comprises the laser apparatus recited in claim 9.

16. The femtosecond laser system according to claim 15, wherein the pulse stretcher and the pulse compressor are integrally formed via one spectral device commonly shared by the pulse stretcher and the pulse compressor.

17. The femtosecond laser system according to claim 15, further comprising:
a spectral shaper configured to shape a spectrum of the stretched pulse.

18. A femtosecond laser apparatus comprising:
a first laser material and a second laser material facing each other;
a first laser diode and a second laser diode arranged to make pump beams incident on the first laser material and the second laser material, respectively; and
a beam dumper arranged between the first laser material and the second laser material, the beam dumper comprising a hole to pass laser beams generated from the first and second laser materials therethrough and a beam absorbing part formed adjacent to the hole to cut off or absorb the pump beams failed to be absorbed to the first and second laser materials.

19. The femtosecond laser apparatus according to claim 18, wherein the beam absorbing part has a diameter getting smaller to a central portion from both lateral ends of the beam dumper.

20. The femtosecond laser apparatus according to claim 18, wherein the beam absorbing part is anodized.

21. The femtosecond laser apparatus according to claim 18, wherein the beam dumper comprises a cold water channel provided therein.

22. The femtosecond laser apparatus according to claim 18, wherein the beam dumper comprises an insertion hole and connection means is inserted in the insertion hole to make the beam dumper integrally formed with optical components.

23. The femtosecond laser apparatus according to claim 21, wherein the cold water channel is arranged adjacent to the beam absorbing part.

24. A femtosecond laser system comprising:
a master oscillator configured to generate a pulse in a femtosecond range;
a pulse stretcher configured to stretch the width of the generated pulse;
an amplifier configured to amplify an energy of the stretched pulse; and
a pulse compressor configured to compress the amplified pulse into a pulse in the femtosecond range,
wherein at least one of the master oscillator and the amplifier comprises the laser apparatus recited in claim 18.

25. The femtosecond laser system according to claim 24, wherein the pulse stretcher and the pulse compressor are integrally formed via one spectral device commonly shared by the pulse stretcher and the pulse compressor.

26. The femtosecond laser system according to claim 24, further comprising:
a spectral shaper configured to shape a spectrum of the stretched pulse.

* * * * *